(12) United States Patent
Ezoe et al.

(10) Patent No.: US 7,983,828 B2
(45) Date of Patent: Jul. 19, 2011

(54) AUTOMATIC BRAKE CONTROL DEVICE

(75) Inventors: Toshiki Ezoe, Tokyo (JP); Shuji Narada, Tokyo (JP); Naoshi Ichinose, Tokyo (JP); Koichi Okamoto, Tokyo (JP); Hirokazu Okuyama, Tokyo (JP)

(73) Assignee: Hino Motors Ltd., Tokyo (JP)

( * ) Notice: Subject to any disclaimer, the term of this patent is extended or adjusted under 35 U.S.C. 154(b) by 180 days.

(21) Appl. No.: 12/064,600

(22) PCT Filed: Aug. 8, 2006

(86) PCT No.: PCT/JP2006/315645
§ 371 (c)(1),
(2), (4) Date: Feb. 22, 2008

(87) PCT Pub. No.: WO2007/023667
PCT Pub. Date: Mar. 1, 2007

(65) Prior Publication Data
US 2009/0150034 A1     Jun. 11, 2009

(30) Foreign Application Priority Data

| Aug. 24, 2005 | (JP) | 2005-242071 |
| Aug. 24, 2005 | (JP) | 2005-242082 |
| Oct. 28, 2005 | (JP) | 2005-314550 |
| Oct. 28, 2005 | (JP) | 2005-314566 |
| Jan. 10, 2006 | (JP) | 2006-002023 |

(51) Int. Cl.
*B60T 7/12* (2006.01)
*H02P 15/02* (2006.01)

(52) U.S. Cl. .................. 701/78; 701/83; 701/71; 477/9; 477/4; 180/275; 280/605

(58) Field of Classification Search .................... 701/53, 701/62–124; 180/275, 276, 370, 170–179, 180/15, 16, 19.1; 280/605, 11.204–11.217, 280/28.11, 264, 427–428, 33.994, 124.105, 88, 188; 477/4, 9, 21–29, 40, 56, 60, 71, 94, 170, 172, 182–211; 475/97–116, 138, 140, 154–157, 173–175, 187–188; 242/338.1, 343, 343.1, 355, 243, 286, 381, 421–422.2; 303/9.71, 122.03, 124, 152, 167, 191
See application file for complete search history.

(56) References Cited

U.S. PATENT DOCUMENTS
6,724,300 B2 * 4/2004 Miyakoshi et al. ........... 340/435
(Continued)

FOREIGN PATENT DOCUMENTS
DE     198 59 743 A1    6/2000
(Continued)

*Primary Examiner* — Jack Keith
*Assistant Examiner* — Muhammad Shafi
(74) *Attorney, Agent, or Firm* — Stephen M Chin, Esq.

(57) ABSTRACT

A stepwise brake control is automatically performed when TTC obtained according to a relative distance and a relative speed between a vehicle and an object is lower than a predetermined value. For example, a brake force or a brake reduction speed is gradually increased over a plurality of stages in time series. Moreover, the affect of speed change control to the automatic brake control is removed. Alternatively, automatic brake control is supported by the speed change control. Alternatively, the friction coefficient state is estimated, and the brake force or the brake speed reduction is adjusted according to the estimated result. Alternatively, an auto-cruse function is invalidated at least the final stage. Alternatively, when the brake force or the brake speed reduction generated by a brake operation by a driver is greater than the brake force or the brake speed reduction generated by the brake control means, the brake operation by the driver is handled with a higher priority than the stepwise brake control.

2 Claims, 27 Drawing Sheets

U.S. PATENT DOCUMENTS

| | | | |
|---|---|---|---|
| 6,937,429 B2 * | 8/2005 | Yoshida et al. | 360/78.06 |
| 7,077,484 B2 * | 7/2006 | Sasaki et al. | 303/152 |
| 2002/0117918 A1 * | 8/2002 | Shimizu et al. | 310/77 |
| 2005/0038589 A1 * | 2/2005 | Shukla | 701/80 |

FOREIGN PATENT DOCUMENTS

| | | | |
|---|---|---|---|
| EP | 1 194 308 B1 | | 8/2006 |
| JP | 59-32552 | | 2/1984 |
| JP | 4-203435 | | 7/1992 |
| JP | 10-329684 | | 12/1999 |
| JP | 2002-67843 | | 3/2002 |
| JP | 2003-54394 | | 2/2003 |
| JP | 2003-528762 | | 9/2003 |
| JP | 2004-161099 | | 6/2004 |
| JP | 2004-210148 | | 7/2004 |
| JP | 2004-330972 | | 11/2004 |
| JP | 2004-545031 | | 11/2004 |
| JP | 2005001581 | * | 1/2005 |
| JP | 2005-28992 | | 2/2005 |
| JP | 2005-31967 | | 2/2005 |
| JP | 2005-164010 | | 6/2005 |

* cited by examiner

At the time of semi-load
(subject vehicle speed before brake control is started ≧ 60km/h)

At the time of semi-load
(15km/h ≦ subject vehicle speed before brake control is started < 60km/h)

At the time of constant-load
(subject vehicle speed before brake control is started ≧ 60km/h)

At the time of constant-load
(15km/h ≦ subject vehicle speed before brake control is started < 60km/h)

AUTOMATIC BRAKE CONTROL DEVICE

CROSS REFERENCES TO RELATED APPLICATIONS

This application claims priority to international application number PCT/JP 2006/315645 filed on Aug. 8, 2006 which claims priority to the following 5 Japanese patent applications bearing application numbers: (a) 2005-242071 filed on Aug. 24, 2005; (b) 2005-242082 filed on Aug. 24, 2005; (c) 2005-314550 filed on Oct. 28, 2005; (d) 2005-314566 filed on Oct. 28, 2005; and 2006-002023 filed on Jan. 10, 2006, the entire disclosures of which are hereby incorporated by reference.

TECHNICAL FIELD

The present invention is utilized for a heavy vehicle (truck, bus) for transporting cargos and passengers.

BACKGROUND ART

An electronic control tendency of an automobile gets ahead quickly, and an event which previously depended upon a driver's judgment is also controlled by a computer loaded on a vehicle.

As one example, there is an automatic brake control device in which a distance between a subject vehicle and a vehicle ahead (distance between the vehicles) is monitored by a radar, and when the distance between the vehicles becomes abnormally short, brake control is performed automatically, and when collision occurs, damage is suppressed to a small level (see patent document 1 for example).
Patent Document 1: JP2005-31967A

DISCLOSURE OF THE INVENTION

Problem to be Solved by the Invention

The above-described automatic brake control device is becoming commercially practical for a passenger vehicle, but when attempt is made to utilize the same function for a heavy vehicle (truck, bus) for transporting cargos or passengers, there are problems which must be solved.

That is, the heavy vehicle has extremely large mass as compared with a passenger vehicle, it is necessary to secure safety for the passengers or cargos in addition to safety for a driver himself or herself, it is difficult to achieve the intended purpose only by simple abrupt brake control which is carried out in an automatic brake control of a passenger vehicle, and it is necessary to perform more precise automatic brake control as compared with the passenger vehicle. However, since such means is not established, an automatic brake control device for a truck or a bus has not yet become commercially practical.

The present invention has been accomplished under such background, and it is an object of the invention to provide an automatic brake control device capable of realizing the automatic brake control in a truck and a bus.

Means for Solving the Problems

An automatic brake control device of the present invention is a device capable of moderating an impact caused at the time of collision by carrying out stepwise brake control while maintaining safety of a vehicle even if the vehicle is a heavy vehicle such as a truck and a bus.

That is, the present invention relates to an automatic brake control device having control means which automatically performs brake control even without driving operation based on an sensor output including a distance between a subject vehicle and an object existing ahead of the subject vehicle.

The present invention is characterized in that the subject vehicle includes speed change control means which automatically sets a gear of a transmission in accordance with a subject vehicle speed, the control means includes stepwise brake control means which automatically performs stepwise brake control when an estimated value of time elapsed until a distance between the object and the subject vehicle derived based on a relative distance and a relative speed of the object and the subject vehicle obtained by the sensor output becomes equal to or smaller than a predetermined distance becomes less than a predetermined value, the stepwise brake control means includes brake control means which gradually increases a brake force or a brake reduction speed over a plurality of stages in time series, and there is provided means which prohibits the speed change control means from changing the gear when the stepwise brake control means is carrying out the stepwise brake control.

The estimated value of time elapsed until a distance between the object and the subject vehicle derived based on the relative distance and relative speed of the object and the subject vehicle becomes equal to or less than the predetermined distance is an estimated value of time elapsed until the object and the subject vehicle collide against each other (TTC (Time To Collision), hereinafter).

The speed change control means performs control to set a gear of the transmission automatically in accordance with the subject vehicle speed. At that time, the speed change control means automatically controls the connection and disconnection of the clutch and controls the gear change.

Conventionally, the automatic brake control device and the speed change control means are not associated with each other, and if the automatic brake control is started, the subject vehicle speed is reduced. Therefore, the speed change control means automatically and autonomously starts controlling the connection and disconnection of the clutch and the gear change. At that time, if the automatic brake control timing and the clutch disconnection timing are superposed on each other, the engine brake (or engine retarder) fails. Under such situation, fluctuation is generated in control pattern of the automatic brake control device, and there is a possibility that the desired function of the automatic brake control device can not sufficiently be exhibited. Therefore, the gear change by the speed change control means is prohibited simultaneously when the automatic brake control is started, and the factor which generates the fluctuation in the control pattern of the automatic brake control device is eliminated.

The above-described invention is effective when the automatic brake control device and the speed change control means are not associated with each other as in the conventional technique, but unlike the conventional technique, the following inventions relate to techniques in which the automatic brake control device and the speed change control means are positively associated with each other and the speed change control means assists the function of the automatic brake control device.

For example, the automatic brake control device further comprises means which instructs the speed change control means to change down the gear one by one in accordance with the stepwise brake control performed by the stepwise brake control means. With this, as the brake force or brake reduction speed is stepwisely increased, the effect of the engine brake becomes stepwisely greater and thus, the automatic brake control can be assisted by the speed change control.

Alternatively, the automatic brake control device further comprises means which instructs the speed change control means to set a previously designated gear in accordance with the stepwise brake control performed by the stepwise brake control means. With this, as the brake force or brake reduction speed is stepwisely increased, the effect of the engine brake becomes stepwisely greater as described above. In addition to this control pattern, it is also possible to freely employ various control patterns such as a control pattern in which the effect of the engine brake is set maximum from the initial stage of the stepwise brake control, and thereafter, the subject vehicle speed is reduced only by the brake control, and a control pattern in which the effect of the engine brake is set maximum only at the final stage of the stepwise brake control.

In addition to the competition control or the associative control between the automatic brake control device and the speed change control means, the automatic brake control device may comprise friction coefficient estimating means which estimates a friction coefficient state between a road surface and a tire, and brake force or brake reduction speed adjusting means which adjusts the brake force and the brake reduction speed by the brake control means based on an estimation result of the friction coefficient estimating means. With this, it is possible to perform more reliable automatic brake control.

That is, the automatic brake control device of the present invention is designed based on the precondition that the device is used on a general pavement such as asphalt. Therefore, a set value of a brake force or a brake reduction speed when the automatic brake control is executed is set based on a friction coefficient between a general paved road and a tire. However, in an actual case, a vehicle runs on various road surfaces due to snow, rain or unpaved road.

According to the invention, it is possible to adjust the brake force or the brake reduction speed during the automatic brake control to an appropriate value in accordance with a friction coefficient between a road surface and a tire, and it is possible to maintain the safety of a vehicle during the automatic brake control at high level.

Further, the estimation result is divided into a plurality of stages in accordance with a degree of the friction coefficient and outputted, and the brake force or brake reduction speed adjusting means includes means which reduces the brake force or the brake reduction speed in a plurality of stages in accordance with the divided estimation results.

With this structure, it is possible to finely adjust the brake force or the brake reduction speed in accordance with a degree of the friction coefficient between a road surface and a tire.

When the vehicle includes speed maintaining means which maintains the subject vehicle speed at a predetermined speed in accordance with operation input, it is preferable that the automatic brake control device further includes means which cancels the maintenance of the subject vehicle speed by the speed maintaining means at least at a final stage when the stepwise brake control is carried out by the stepwise brake control means.

The speed maintaining means is a function which is generally called auto-cruise, and this function automatically maintains a constant speed which is set in accordance with a driver's operation input until braking operation or operation of an accelerator pedal is carried out.

This auto-cruise function and the automatic brake control function are functions which are opposite from each other. That is, one of the functions maintains the constant speed and the other function reduces the speed. In this invention, the automatic brake control function is performed with a higher priority than the auto-cruise function, and when the automatic brake control is carried out, the auto-cruise function is canceled.

In the initial stage of the automatic brake control, there still remains a possibility that a collision can be prevented by the steering operation, and in this initial stage, the necessity for canceling the auto-cruise function is low. Therefore, in this invention, the auto-cruise function is canceled at least at the final stage of the stepwise brake control, but the auto-cruise function is left effective in a stage before the final stage.

The automatic brake control device may further include means for informing a driver that the maintenance of the subject vehicle speed by the speed maintaining means is canceled when the maintenance of the subject vehicle speed by the speed maintaining means is canceled. With this, a driver can recognize the generation of emergency so that the driver can take countermeasure for avoiding this.

Alternatively, the automatic brake control device may further comprise means for informing a driver that the maintenance of the subject vehicle speed by the speed maintaining means is to be canceled before the maintenance of the subject vehicle speed by the speed maintaining means is canceled. With this, a driver can recognize the generation of emergency at an earlier stage and thus, the driver can take countermeasure for avoiding this at an earlier stage. Thus, the probability of success of avoiding the emergency becomes high.

Alternatively, the automatic brake control device may further comprise braking operation state detecting means which detects a braking operation state of a driver, and the braking operation state detecting means detects a braking operation state of the driver, and when a brake force or a brake reduction speed generated with the braking operation of the driver is greater than a brake force or a brake reduction speed generated by the brake control means, the braking operation of the driver may be performed with a higher priority than the stepwise brake control.

With this, when a driver is normally driving a vehicle without dozing or looking aside and carrying out the collision avoiding operation, one of a brake force or a brake reduction speed generated by the braking operation of the driver and a brake force or a brake reduction speed generated by the brake control means of the device of the present invention is employed with higher priority than the other. With this, even if the driver is carrying out the collision avoiding operation, the automatic brake control of the device of the invention can be utilized.

Also, the automatic brake control device can include means which prohibits actuation of the stepwise brake control means when the subject vehicle speed is less than a predetermined value and a value of the steering angle or a yaw rate is out of a predetermined range.

That is, the stepwise brake control carried out by the automatic brake control device of the invention is based on the assumption that it is used when a subject vehicle speed before the brake control is started is 60 km/h or more and a large steering operation such as changing lane or running on a sharp curve is not carried out. Therefore, the actuation of the stepwise brake control can be limited in a running state other than the above running states.

For example, if the subject vehicle speed before the brake control is started is less than 60 km/h, the kinetic energy of the vehicle is small and thus, no problem occurs even when simple abrupt brake control which is conventionally applied to a passenger vehicle is carried out and thus, the actuation of the stepwise brake control is limited. If the steering angle before the brake control is started is +30 degrees or more or −30 degrees or less, this means that a lane is being changed or the vehicle is running on a sharp curve and this is a case in which the stepwise brake control should not be applied, and the actuation thereof is limited. In this case, a yaw rate may be used instead of the steering angle.

Effect of the Invention

According to the present invention, it is possible to realize the automatic brake control in a truck or a bus. Especially, it is possible to realize competition control or association control between automatic brake control and speed change control means. Alternatively, it is possible to carry out automatic brake control by an appropriate brake force or a brake reduction speed in accordance with a friction coefficient between a road surface and a tire. Alternatively, it is possible to compete against an auto-cruise function.

According to the invention, it is possible to reduce damage caused by collision by using both the automatic brake control in a truck or a bus and the driver's collision avoiding operation. For example, even when a driver is suddenly brought in a condition that it is difficult to apply brake due to unexpected situation, it is possible to reliably reduce the speed of the subject vehicle by the automatic brake control. Even when a driver is suddenly brought in a condition that it is difficult to apply brake due to unexpected situation, it is possible to reliably reduce the speed of the subject vehicle by the automatic brake control.

Figure 1:
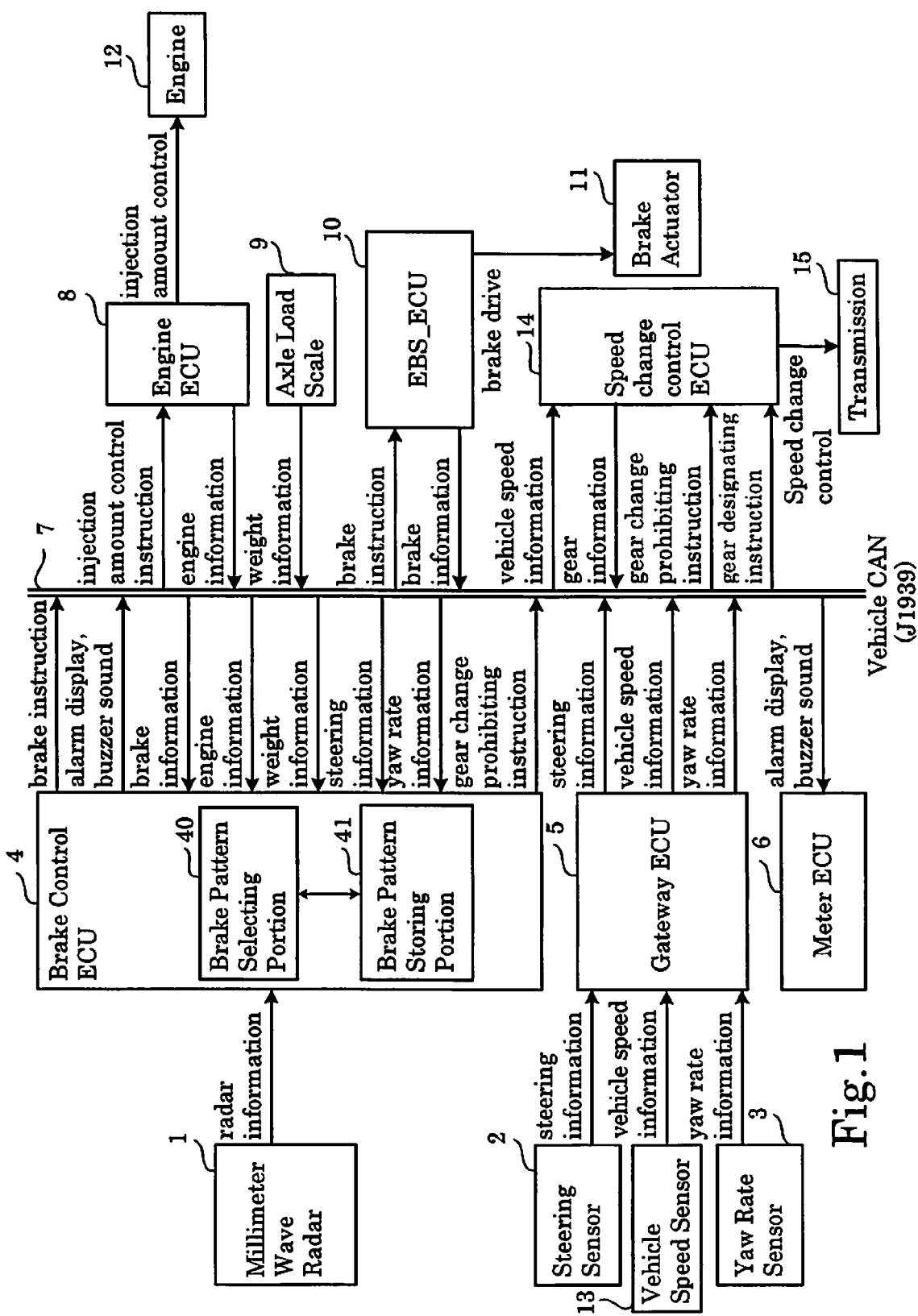
FIG. 1 is a block diagram of a control system according to a first embodiment.

DESCRIPTION OF REFERENCE NUMERALS 1 millimeter wave radar
2 steering sensor
3 yaw rate sensor
4 brake control ECU
5 gateway ECU
6 meter ECU
7 VehicleCAN(J1939)
8 engine ECU
9 axle load scale
10 EBS_ECU
11 brake actuator
12 engine
13 vehicle speed sensor
14 speed change control ECU
15 transmission
16 left and right front wheel revolution speed sensor
17 ABS
18 auto-cruise ECU
40 control pattern selecting portion
41 control pattern storing portion
42 friction coefficient estimating portion
43 brake force adjusting portion
50 acceleration detecting portion
51 ABS detecting portion
52 estimation result outputting portion

BEST MODE FOR CARRYING OUT THE INVENTION

Figure 2:
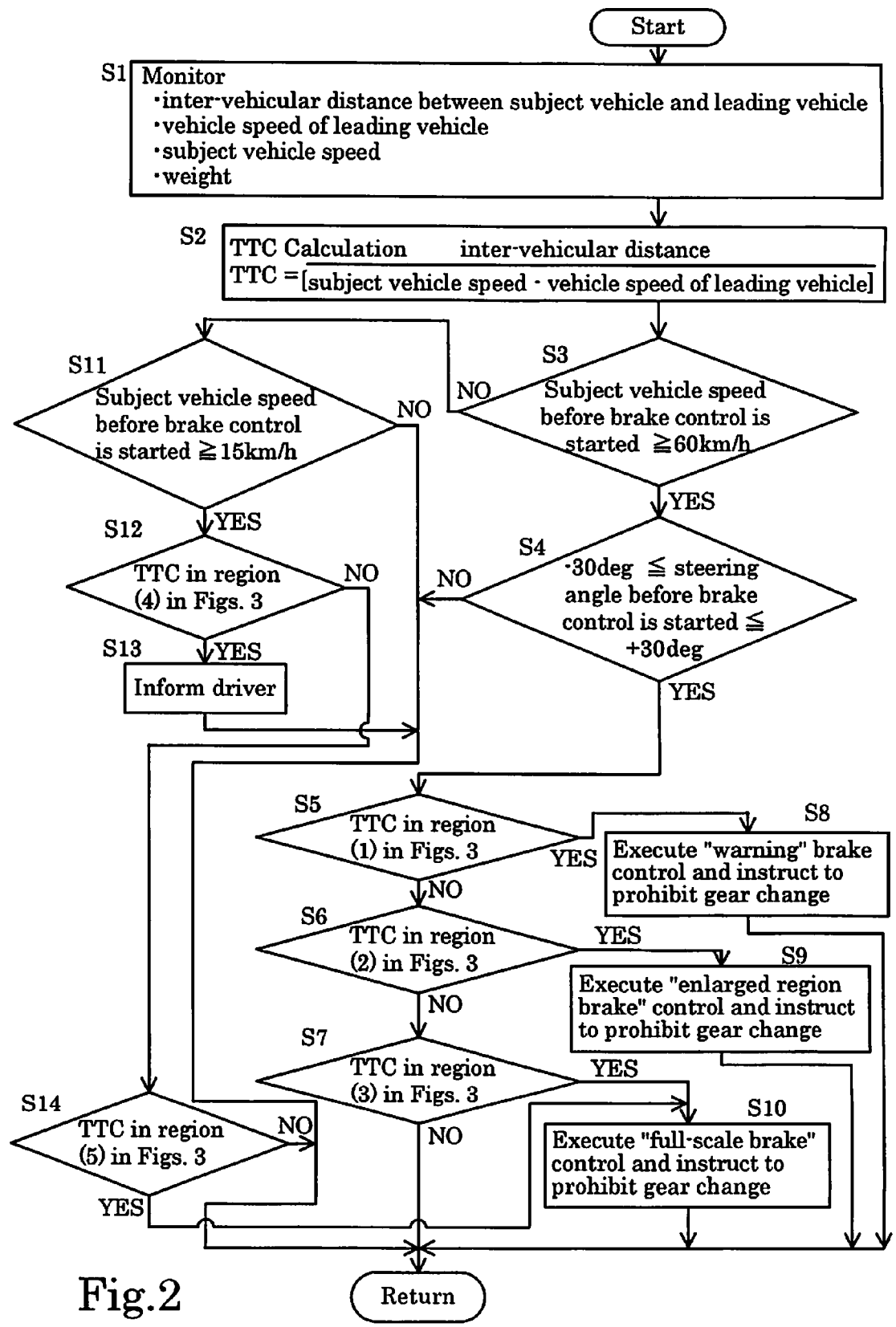
FIG. 2 is a flowchart showing control procedure of a brake control ECU of the first embodiment.
Figure 3A:
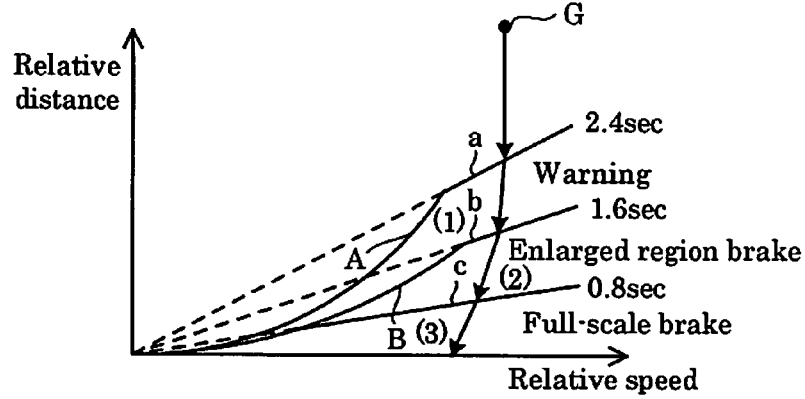
FIG. 3 are diagrams showing brake patterns at the time of no-load of the brake control ECU of the first embodiment.
Figure 4A:
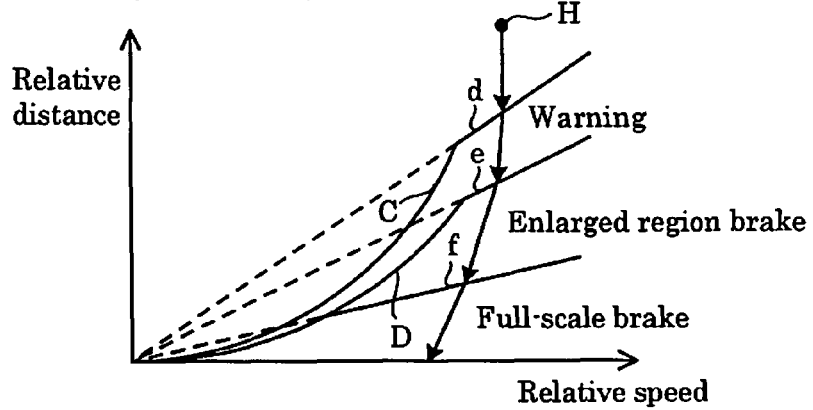
FIG. 4 are diagrams showing brake patterns at the time of semi-load of the brake control ECU of the first embodiment.
Figure 4B:
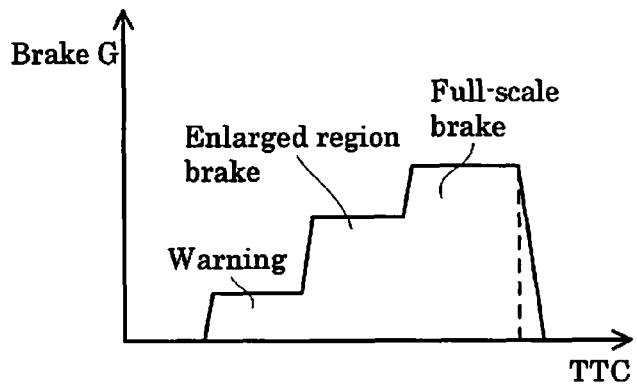
Figure 4C:
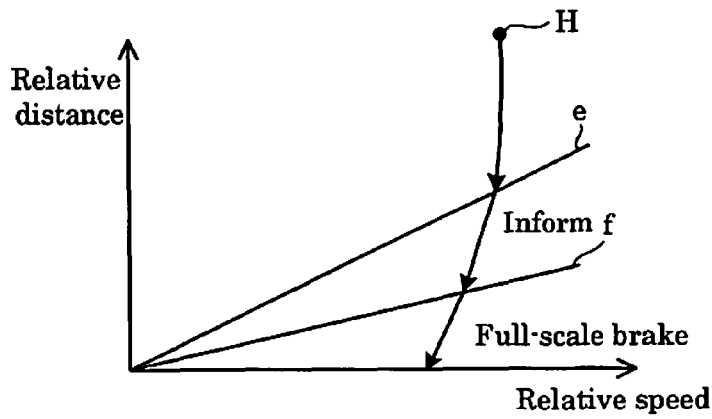
Figure 5A:
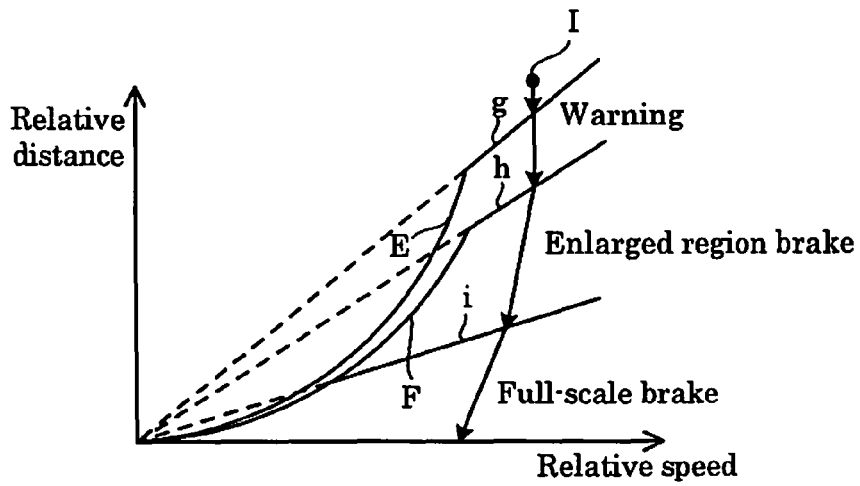
FIG. 5 are diagrams showing brake patterns at the time of constant-load of the brake control ECU of the first embodiment.
Figure 5B:
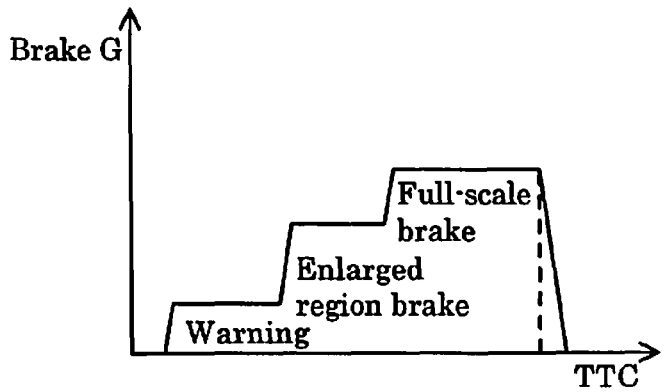
Figure 5C:
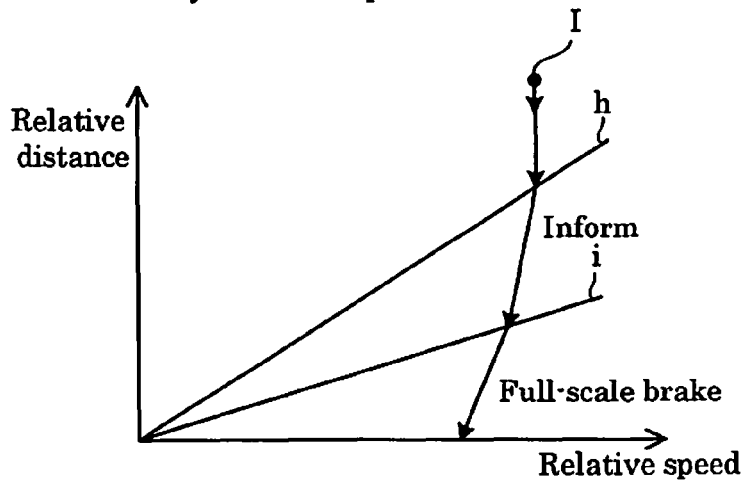
Figure 6:
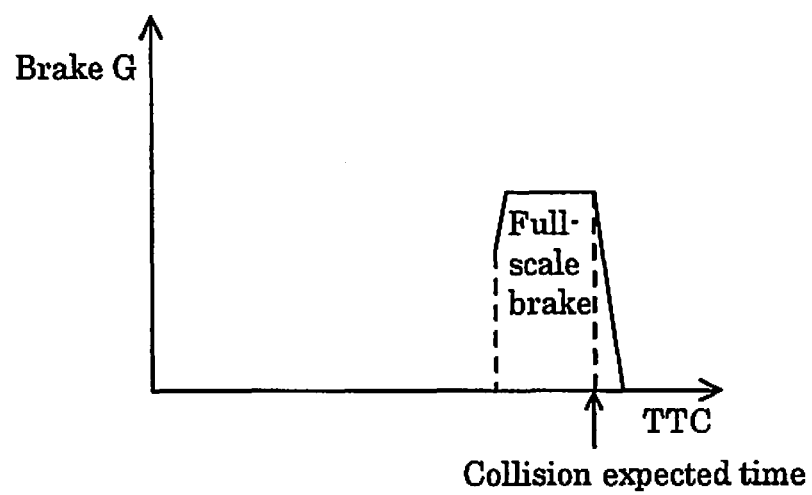
FIG. 6 is a diagram showing a full-scale brake pattern of the brake control ECU of the first embodiment.

An automatic brake control device according to a first embodiment will be explained with reference to FIGS. 1 to 6. FIG. 1 is a configuration diagram of a control system according to the present embodiment. FIG. 2 is a flowchart showing control procedure of a brake control ECU (Electric Control Unit) according to the present embodiment. FIG. 3 are diagrams showing brake patterns of the brake control ECU of the present embodiment at the time of no-load. FIG. 4 are diagrams showing brake patterns of the brake control ECU of the present embodiment at the time of semi-load. FIG. 5 are diagrams showing brake patterns of the brake control ECU of the present embodiment at the time of constant-load. FIG. 6 is a diagram showing a brake pattern of the brake control ECU of the present embodiment at the time of full-scale.

As shown in FIG. 1, a brake control ECU 4, a gateway ECU 5, a meter ECU 6, an engine ECU 8, an axle load scale 9, an EBS (Electric Breaking System)_ECU 10 and a speed change control ECU 14 are connected to each other through a VehicleCAN(J1939) 7.

A steering sensor 2, a yaw rate sensor 3 and a vehicle speed sensor 13 are connected to the vehicle CAN (J1939) 7 through the gateway ECU 5, respectively, and sensor information thereof is taken into the brake control ECU 4. The brake control is performed by driving a brake actuator 11 by the EBS_CU 10. A brake command to the EBS_CU 10 is carried out by the braking operation at a driver's seat (not shown) and the brake control ECU 4. Brake information including information of braking operation by a driver is output by the EBS_ECU 10 and taken into the brake control ECU 4. The engine ECU 8 performs fuel injection amount control of the engine 12 and other control of the engine. The injection amount control command to the engine ECU 8 is carried out by acceleration operation at the driver's seat. An alarm display and a buzzer sound output from the brake control ECU 4 are displayed on a display (not shown) at the driver's seat by the meter ECU 6. Since a control system related to steering operation other than the steering sensor 2 does not relate directly to the present invention, they are not illustrated.

The speed change control ECU 14 controls the gear change of a transmission 15 and connection and disconnection of the clutch based on vehicle speed information. When a gear change instruction is given to the speed change control ECU 14 by the operation of a gear change lever at the driver's seat, the speed change control ECU 14 follows the instruction. Gear information which is output from the speed change control ECU 14 is taken into the brake control ECU 4. The speed change control ECU 14 stops the gear change of the transmission 15 by a gear change prohibiting instruction which is output from the brake control ECU 4.

As shown in FIG. 1, the present embodiment is an automatic brake control device including a millimeter wave radar 1 for measuring a distance between a subject vehicle and a vehicle ahead of the subject vehicle or an object such as a falling body, a steering sensor 2 for detecting a steering angle, a yaw rate sensor 3 for detecting a yaw rate, and a brake control ECU 4 which automatically performs brake control based on sensor output such as a vehicle speed sensor 13 which detects a subject vehicle speed even if there is no driving operation.

The brake control ECU 4 includes a stepwise brake control means which automatically performs stepwise brake control when TTC derived from a relative distance and a relative speed between the object and the subject vehicle obtained from the sensor output from the millimeter wave radar 1 and the vehicle speed sensor 13 is lower than a predetermined value.

Figure 3B:
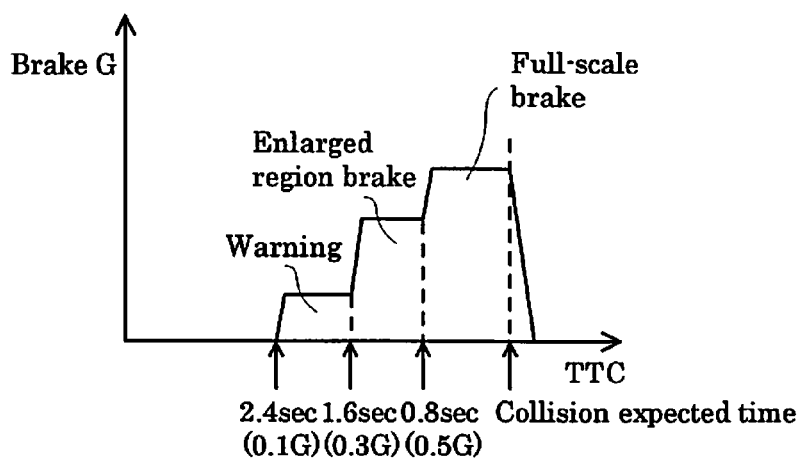

This stepwise brake control means, as shown in FIG. 3b, includes brake control means which gradually increases a brake force in three stages in time series. In the example shown in FIG. 3b, at a first stage described as "warning", a brake force of about 0.1 G is applied from TTC 2.4 seconds to 1.6 seconds. At this stage, a so-called abrupt brake is not yet applied, a stop lamp is lit and it is possible to inform a vehicle behind of the fact that abrupt brake will be applied soon. Next, at a second stage described as "enlarged region brake", a brake force of about 0.3 G is applied from TTC 1.6 seconds to 0.8 seconds. Lastly, at a third stage described as "full-scale brake", the maximum brake force (about 0.5 G) is applied from TTC 0.8 seconds to 0 second.

In the present embodiment, as shown in FIGS. 3 to 5, the brake control ECU 4 includes a brake pattern selecting portion 40 which changes a brake pattern in accordance with an onboard cargo or a weight of passengers. The brake pattern can be changed in such a manner that a plurality of control patterns "at the time of no-load", "at the time of semi-load" and "at the time of constant-load" are previously stored in a brake pattern storing portion 41 of the brake control ECU 4, and the brake pattern selecting portion 40 selects a suitable brake pattern from the brake patterns in accordance with the weight. The weight information of the onboard cargo or the passenger is obtained by the axle load scale 9 shown in FIG. 1 and taken into the brake control ECU 4.

The following explanation is based on a vehicle ahead of the subject vehicle, but the automatic brake control device of the present embodiment is also effective for a falling body on a road.

As shown in FIG. 1, the subject vehicle is provided with the speed change control ECU 14 which automatically sets a gear of the transmission 15 in accordance with a subject vehicle speed. In the first embodiment, the brake control ECU 4 sends a gear change prohibiting instruction for prohibiting the speed change control ECU 14 to change a gear to the speed change control ECU 14 when the stepwise brake control is carried out by the stepwise brake control means.

With this, it is possible to avoid a fluctuation in control pattern caused by clutch-disconnection control or gear change control of the speed change control ECU 14 during brake control shown in FIGS. 3 to 5.

The automatic brake control device includes means which prohibits actuation of the stepwise brake control means when the subject vehicle speed is less than 60 km/h and a steering angle is +30 degrees or greater or −30 degrees or less. A yaw rate may be used instead of the steering angle.

That is, the stepwise brake control performed by the automatic brake control device of the present embodiment is based on the assumption that it is used when a subject vehicle speed before the brake control is started is 60 km/h or more and a large steering operation such as lane changing or running on sharp curve is not carried out. Therefore, the actuation of the stepwise brake control in a running state other than above can be limited.

When the subject vehicle speed before the brake control is started is less than 60 km/h, since kinetic energy of the vehicle is small, no problem is caused even if simple abrupt brake control which is conventionally applied in passenger vehicles is carried out, usefulness for performing the stepwise brake control is low and thus, actuation of the stepwise brake control is limited. If a steering angle before the brake control is started is +30 degrees or greater or −30 degrees or less, since this means that the vehicle is changing a lane or running on a sharp curve, this is out of condition for applying the stepwise brake control, and actuation of the stepwise brake control is limited. In this case, a yaw rate may be used instead of the steering angle.

In the present embodiment, when the subject vehicle speed before the brake control is started is less than 60 km/h and 15 km/h (minimum speed at which usefulness of automatic brake control (only full-scale brake control) is recognized) or greater, the stepwise brake control is not carried out, but only the full-scale brake control shown in FIGS. 3b to 5b is carried out. When only the full-scale brake control is carried out, it is possible to apply the same brake control as the conventional automatic brake control used for passenger vehicles. When the same automatic brake control as that of the conventional technique is applied, a step for determining whether the subject vehicle is changing a lane or running on a sharp curve is unnecessary.

The performance of the automatic brake control device of the present embodiment will be explained with reference to a flowchart in FIG. 2. The explanation of FIG. 2 is based on a brake pattern at the time of no-load (FIG. 3), but performance at the time of semi-load (FIG. 4) or at the time of constant-load (FIG. 5) is also carried out in accordance with the flowchart in FIG. 2. As shown in FIG. 2, the millimeter wave radar 1 measures and monitors a distance between the subject vehicle and a vehicle ahead and the vehicle speed of the vehicle ahead. The vehicle speed sensor 13 measures and monitors the subject vehicle speed. The axle load scale 9 measures and monitors the weight of an onboard cargo and passengers (S1). The brake pattern selecting portion 40 of the brake control ECU 4 previously selects one of brake patterns (FIGS. 3 to 5) based on a result of measurement of the weight. An example in which the brake pattern in FIG. 3 is selected will be explained below.

The TTC is calculated by an inter-vehicular distance, a subject vehicle speed and a vehicle speed of a leading vehicle (S2). The calculating method is inter-vehicular distance/(subject vehicle speed−vehicle speed of leading vehicle). If the subject vehicle speed before brake control is started is 60 km/h or more (S3), if the steering angle before the brake control is started is equal to or less than +30 degrees and equal to or more than −30 degrees (S4) and if the TTC is in the region (1) in FIG. 3a (S5), the "warning" brake control is carried out and a gear change prohibiting instruction is sent to the speed change control ECU 14 (S8). If the TTC is in the region (2) shown in FIG. 3a (S6), the "enlarged region brake" control is carried out and the gear change prohibiting instruction is again sent to the speed change control ECU 14 (S9). If the TTC is in the region (3) shown in FIG. 3a (S7), the "full-scale brake" control is carried out and the gear change prohibiting instruction is again sent to the speed change control ECU 14 (S10).

Figure 3C:
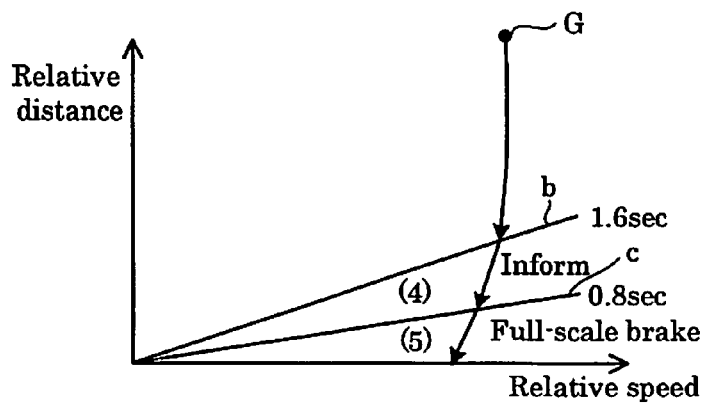

If the subject vehicle speed before the brake control is started is less than 60 km/h and 15 km/h or more (S3, S11) and if the TTC is in the region (4) shown in FIG. 3c (S12), a driver is informed that a relative distance from the leading vehicle is short (S13). The driver is informed by means of an alarm display or a buzzer sound. If the TTC is in the region (5) shown in FIG. 3c (S14), the "full-scale brake" control is carried out and the gear change prohibiting instruction is sent to the speed change control ECU 14 (S10).

It is possible to utilize a yaw rate from the yaw rate sensor 3 instead of the steering angle from the steering sensor 2. Or both the steering angle and the yaw rate may be utilized.

Here, FIGS. 3 to 5 will be explained. Straight lines c, f and i in FIGS. 3 to 5 are called steering avoidance limit straight lines, and curves B, D and F in FIGS. 3 to 5 are called brake avoidance limit curves.

That is, the steering avoidance limit straight line is a straight line showing a limit to avoid collision by steering operation within predetermined TTC in a relation between one relative distance to an object and one relative speed with the object. The brake avoidance limit curve is a curve showing a limit to avoid collision by braking operation within a predetermined TTC in a relation between one relative distance to an object and one relative speed with respect to the object.

In FIGS. 3 to 5, in a region where both lower side regions of the straight line and curve are related, it is not possible to avoid collision by any of steering operation and braking operation.

In the example at the time of no-load in FIG. 3, TTC is set to 0.8 seconds in the straight line c. In the present embodiment, a straight line a when TTC is 2.4 seconds is provided on the upper side of the steering avoidance limit straight line c and a straight line b when TTC is 1.6 seconds is provided. A curve A in which TTC is set to 1.6 seconds is provided on the upper side of a brake avoidance limit curve B in which TTC is set to 0.8 seconds.

The initial state of the vehicle has a relative distance and a relative speed with respect to an object shown at the black point G in FIG. 3. When the subject vehicle speed before the brake control is started is 60 km/h or greater, the relative distance gradually becomes short, and when the relative distance comes to a position of the straight line a, the mode is brought into a warning mode (region (1)). In the warning mode, a brake force of about 0.1 G is applied to TTC 2.4 seconds to 1.6 seconds. In this period, the stop lamp is lit to inform a vehicle behind that a brake is applied. When the relative speed is reduced and it comes to a position of the straight line b, the mode is brought into an enlarged region brake mode (region (2)). In the enlarged region brake mode, a brake force of about 1.3 G is applied to TTC 1.6 seconds to 0.8 seconds. When it comes to a position of the straight line c, the mode is brought into a full-scale brake mode (region (3)). In the full-scale brake mode, the maximum brake force (about 0.5 G) is applied to TTC 0.8 seconds to 0 second. According to the calculation in step 2 in FIG. 2, a collision occurs. However, since the subject vehicle speed becomes small by the brake control in the actual case, the actual TTC becomes longer than the calculation result in step S2.

That is, according to the calculation of TTC in the automatic brake control device in the present invention, precise distance measurement and complicated calculating processing are omitted as much as possible, and a general simple distance measuring device (e.g., a millimeter wave radar) or a calculating device is used. Such consideration is effective for suppressing the producing cost and maintenance cost of a vehicle to low levels.

To be strict, the subject vehicle and a leading vehicle which is an object carry out uniform accelerated motion by braking (deceleration). Therefore, TTC must be calculated also based on the uniform accelerated motion, but TTC is calculated based on the assumption that simple uniform motion is carried out, thereby omitting precise distance measurement and complicated calculation.

By carrying out such calculation based on the assumption that the motion is the uniform motion, the calculated TTC value becomes smaller than the actual TTC, but this is an error on the safe side and thus, no problem occurs even if the error is permitted.

When the subject vehicle speed before the brake control is started is 15 km/h or greater and less than 60 km/h, the relative distance gradually becomes short, and when it comes to a position of the straight line b, the mode is brought into an informing mode (region (4)). In the informing mode, a driver is informed of the fact that the relative distance between the subject vehicle and the object becomes short by means of an alarm display or a buzzer sound. When it comes to a position of the straight line c, the mode is brought into the full-scale brake mode (region (5)). In the full-scale brake mode, the maximum brake force (about 0.5 G) is applied to TTC 0.8 seconds to 0 second.

FIG. 4 show an example at the time of semi-load, and FIG. 5 show an example at the time of constant-load. Here, the equal brake forces are compared with each other, as the weight of onboard cargo or passenger is increased, the braking distance also becomes longer and thus, the steering avoidance limit straight line and the brake avoidance limit curve also move upward in the drawings. With this, areas of the regions (1), (2), (3), (4) and (5) are increased in accordance with the weight of the onboard cargo or passenger.

The straight lines a to c in FIG. 3 correspond to straight lines d to f in FIG. 4 and straight lines g to i in FIG. 5. Curves A and B in FIG. 3 correspond to curves C and D in FIG. 4 and curves E and F in FIG. 5. The black points G in FIG. 3 correspond to black points H in FIG. 4 and black points I in FIG. 5.

Figure 7:
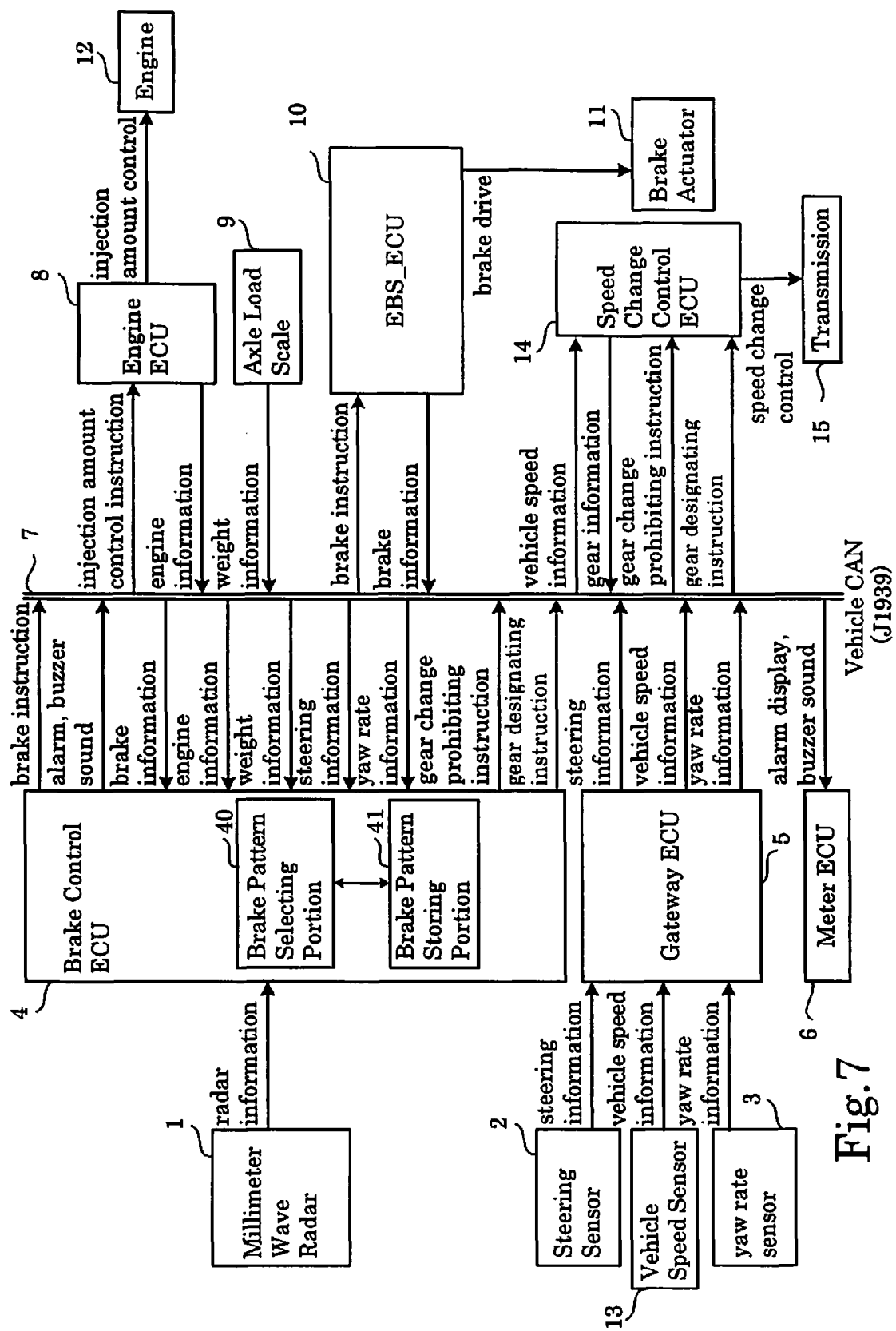
FIG. 7 is a block diagram of a control system according to a second embodiment.
Figure 8:
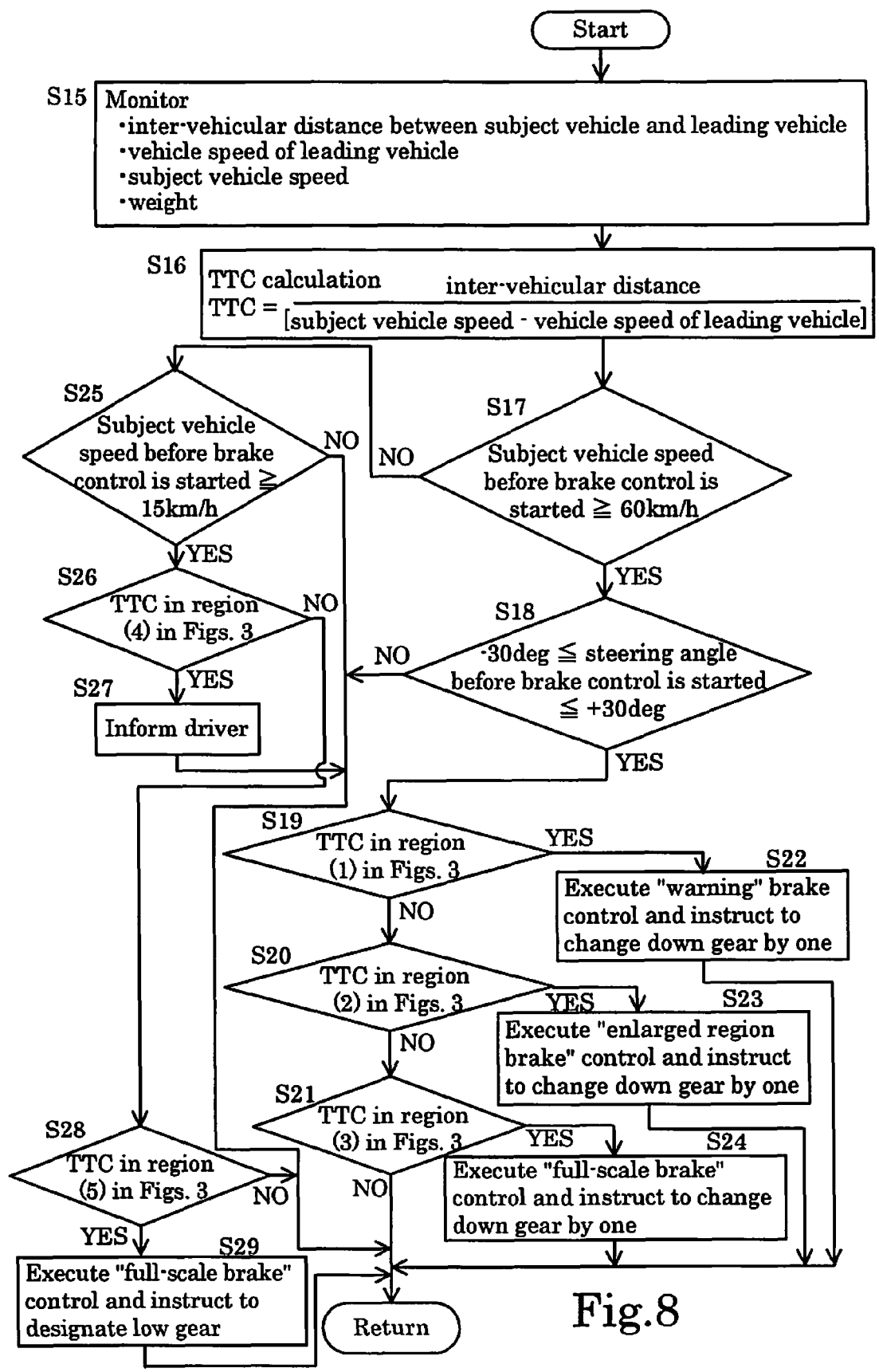
FIG. 8 is a flowchart showing control procedure of a brake control ECU of the second embodiment.
Figure 9:
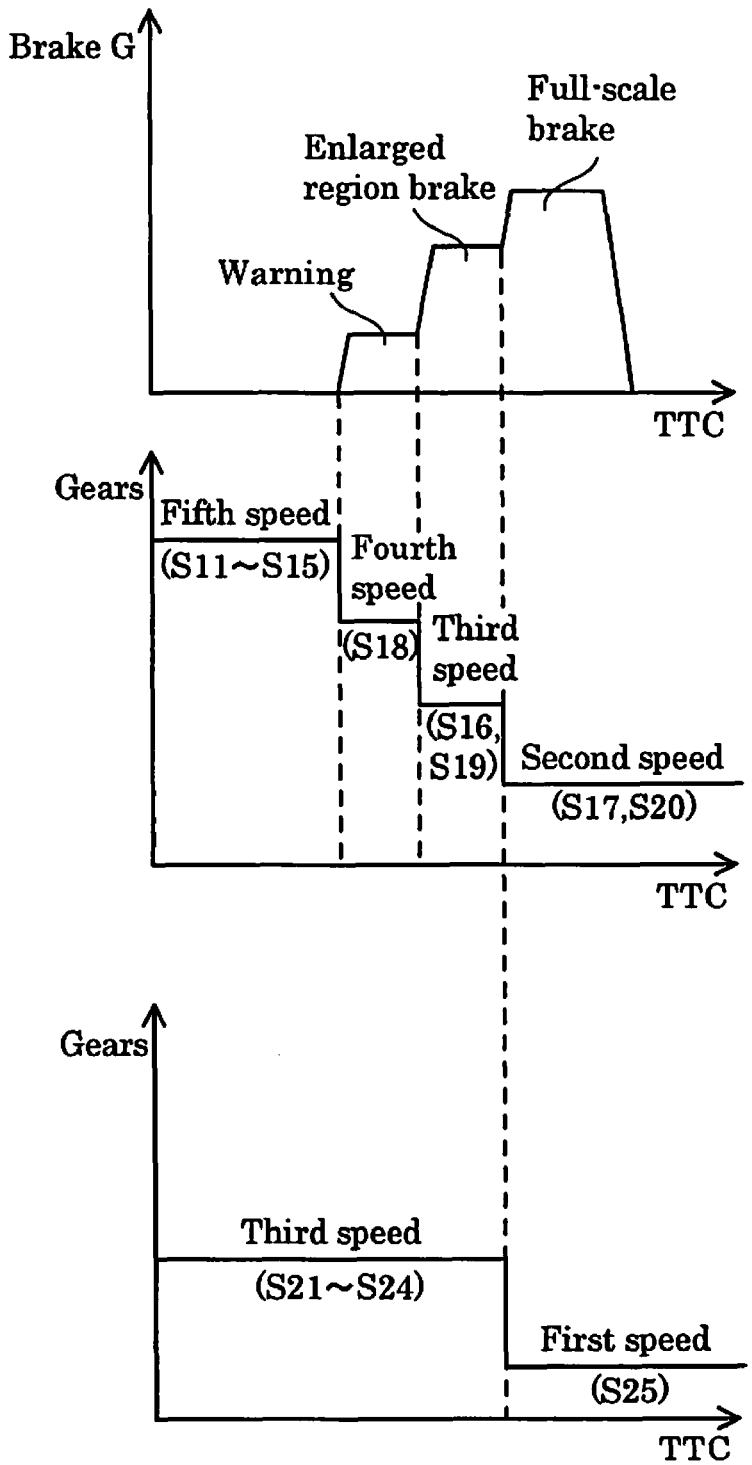
FIG. 9 is a time chart showing a relation between brake control and speed change control of the second embodiment.

A second embodiment will be explained with reference to FIGS. 7 to 9. FIG. 7 is a block diagram of a control system of the embodiment. FIG. 8 is a flowchart showing control procedure of a brake control ECU of the embodiment. FIG. 9 is a time chart showing a relation between brake control and speed change control of this embodiment.

In this embodiment, as shown in FIG. 7, a gear can be designated from the brake control ECU 4 to the speed change control ECU 14. With this, the brake control ECU 4 can instruct the speed change control ECU 14 to change down the gear one by one in accordance with the stepwise brake control by the stepwise brake control means.

That is, as shown in FIG. 8, the millimeter wave radar 1 measures and monitors the inter-vehicular distance from the leading vehicle and the vehicle speed of the leading vehicle. The vehicle speed sensor 13 measures and monitors the subject vehicle speed. The axle load scale 9 measures and monitors the weight of cargo or passengers (S15). The control pattern selecting portion 40 of the brake control ECU 4 previously selects one of control patterns (FIGS. 3 to 5) based on the measuring result of the weight. The following explanation is based on an example in which the control pattern in FIG. 3 is selected, but performance at the time of semi-load (FIG. 4) or at the time of constant-load (FIG. 5) is also carried out in accordance with the flowchart in FIG. 8.

The TTC is calculated by the inter-vehicular distance, the subject vehicle speed and the vehicle speed of a leading vehicle (S16). The calculation method is as described above. If the subject vehicle speed before brake control is started is 60 km/h or more (S17), if the steering angle before the brake control is started is equal to or less than +30 degrees and equal to or more than −30 degrees (S18) and if the TTC is in the region (1) in FIG. 3a (S19), the "warning" brake control is carried out and an instruction for changing down a gear by one is sent to the speed change control ECU 14 (S22). If the TTC is in the region (2) shown in FIG. 3a (S20), the "enlarged region brake" control is carried out and an instruction for further changing down the gear by one is sent to the speed change control ECU 14 (S23). If the TTC is in the region (3) shown in FIG. 3a (S21), the "full-scale brake" control is carried out and an instruction for further changing down the gear by one is sent again to the speed change control ECU 14 (S24).

If the subject vehicle speed before the brake control is started is less than 60 km/h and 15 km/h or more (S17, S25) and if the TTC is in the region (4) shown in FIG. 3c (S26), a driver is informed that a relative distance from the leading vehicle is short (S27). The driver is informed by means of an alarm display or a buzzer sound. If the TTC is in the region (5) shown in FIG. 3c (S28), the "full-scale brake" control is carried out and an instruction for changing the gear to first gear (low gear) is sent to the speed change control ECU 14 (S29).

It is also possible to utilize a yaw rate from the yaw rate sensor 3 instead of the steering angle from the steering sensor 2. Alternatively, both the steering angle and the yaw rate may be used.

In accordance with the control procedure shown in FIG. 8, as shown in FIG. 9, the gear is changed down from the fifth speed to the fourth speed in step S22. In step S 23, the gear is changed down from the fourth speed to the third speed. In step S24, the gear is changed down from the third speed to the second speed. In step S29, the gear is changed down from the third speed to the first speed.

With this, the brake control ECU 4 and the speed change control ECU 14 are operated in association with each other, the gear is changed down as the stepwise brake control proceeds, the effect of the engine brake is enhanced and the automatic brake control can be assisted from the speed change control.

Figure 10:
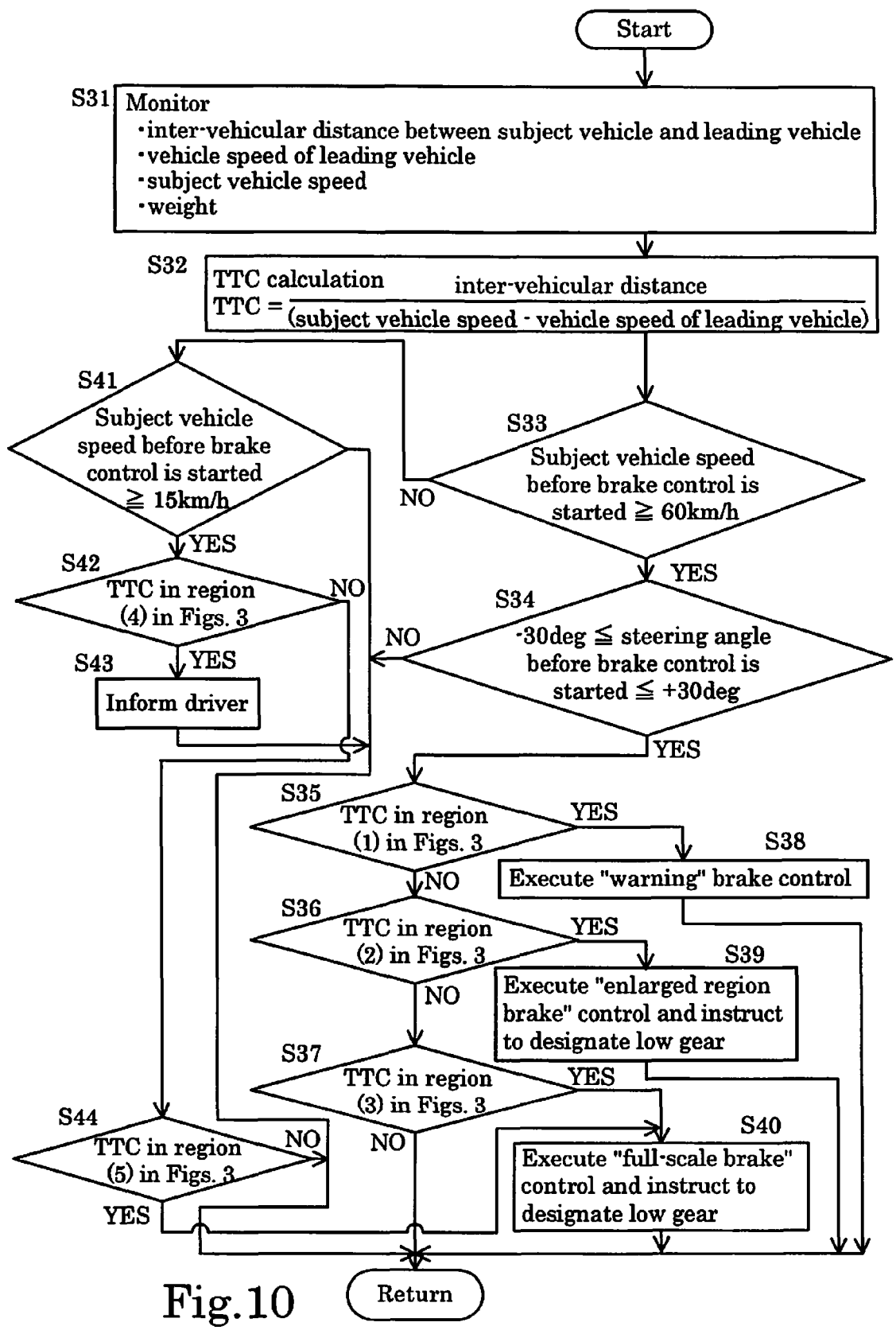
FIG. 10 is a flowchart showing control procedure of a brake control ECU of a third embodiment.
Figure 11:
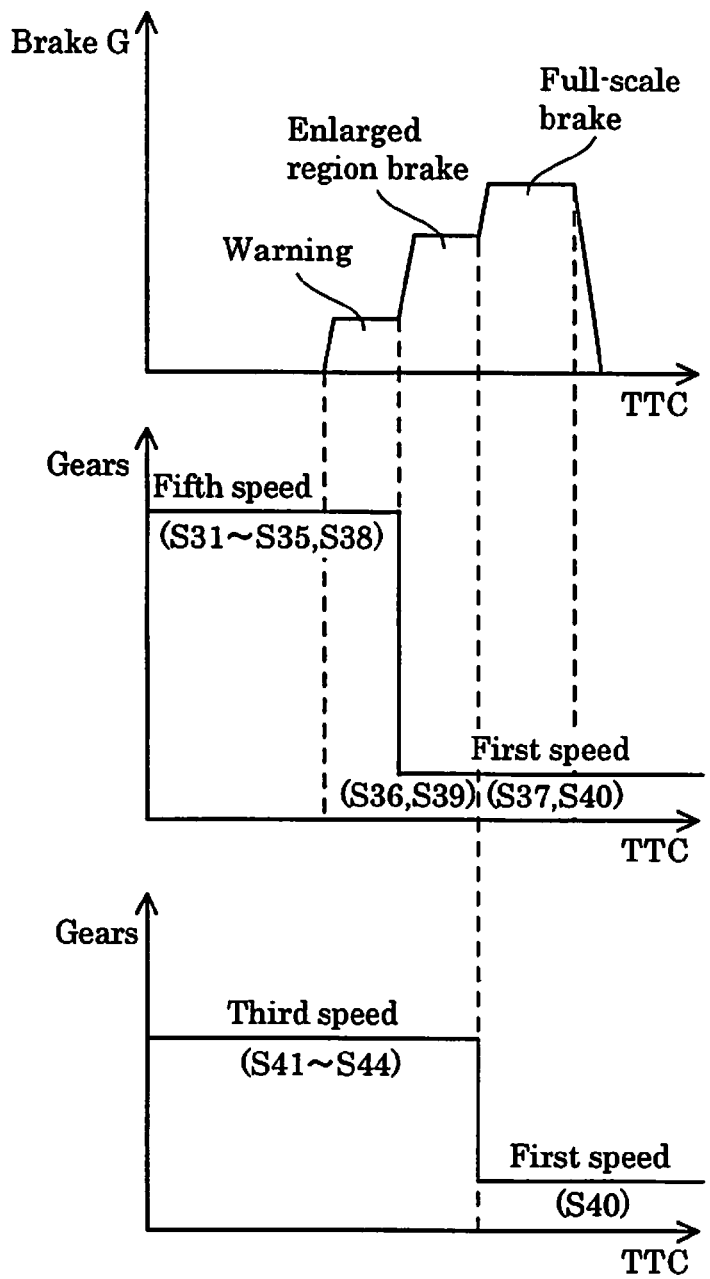
FIG. 11 is a time chart showing a relation between brake control and speed change control of the third embodiment.

A third embodiment will be explained with reference FIGS. 10 and 11. FIG. 10 is a flowchart showing control procedure of the brake control ECU of a third embodiment. FIG. 11 is a time chart showing a relation between brake control and speed change control of the third embodiment. The structure of the control system of the third embodiment is the same as that of the second embodiment (FIG. 7).

In this embodiment, as shown in FIG. 7, the brake control ECU 4 can designate a gear with respect to the speed change control ECU 14. With this, the brake control ECU 4 can instruct the speed change control ECU 14 to set a previously designated gear in accordance with the stepwise brake control set by the stepwise brake control means.

That is, as shown in FIG. 10, the millimeter wave radar 1 measures and monitors an inter-vehicular distance from a leading vehicle and a vehicle speed of the leading vehicle. The vehicle speed sensor 13 measures and monitors the subject vehicle speed. The axle load scale 9 measures and monitors the weight of cargo or passengers (S31). The control pattern selecting portion 40 of the brake control ECU 4 previously selects one of control patterns (FIGS. 3 to 5) based on the measuring result of the weight. The following explanation is based on an example in which the control pattern in FIG. 3 is selected, but performance at the time of semi-load (FIG. 4) or at the time of constant-load (FIG. 5) is also carried out in accordance with the flowchart in FIG. 10

The TTC is calculated by the inter-vehicular distance, the subject vehicle speed and the vehicle speed of a leading vehicle (S32). The calculation method is as described above. If the subject vehicle speed before brake control is started is 60 km/h or more (S33), if the steering angle before the brake control is started is equal to or less than +30 degrees and equal to or more than −30 degrees (S34) and if the TTC is in the region (1) shown in FIG. 3a (S35), the "warning" brake control is carried out (S38). If the TTC is in the region (2) shown in FIG. 3a (S36), the "enlarged region brake" control is carried out and an instruction for changing the gear to the first speed (low gear) is sent to the speed change control ECU 14 (S39). If the TTC is in the region (3) shown in FIG. 3a (S37), the "full-scale brake" control is carried out and an instruction for changing the gear to the first gear is sent again to the speed change control ECU 14 (S40).

If the subject vehicle speed before the brake control is started is less than 60 km/h and 15 km/h or more (S33, S41) and if the TTC is in the region (4) shown in FIG. 3c (S42), a driver is informed that a relative distance from the leading vehicle is short (S43). The drive is informed by means of an alarm display or a buzzer sound. If the TTC is in the region (5) shown in FIG. 3c (S44), the "full-scale brake" control is carried out and an instruction for changing the gear to the first gear (low gear) is sent to the speed change control ECU 14 (S40).

It is also possible to utilize a yaw rate from the yaw rate sensor 3 instead of the steering angle from the steering sensor 2. Alternatively, both the steering angle and the yaw rate may be used.

By the control procedure shown in FIG. 10, as shown in FIG. 11, the fifth speed is changed down to the first speed in step S39. In step S40, the first speed is maintained.

With this, the brake control ECU 4 and the speed change control ECU 14 are operated in association with each other, the gear is changed down as the stepwise brake control proceeds, the effect of the engine brake is enhanced and the automatic brake control can be assisted from the speed change control.

In this embodiment, unlike the second embodiment, the gear is changed down to the first speed (low gear) in one stroke in the "enlarged region brake". With this, when compared with the first embodiment, the control pattern becomes a somewhat hard braking pattern, but this is effective for emergency stop.

Figure 12:
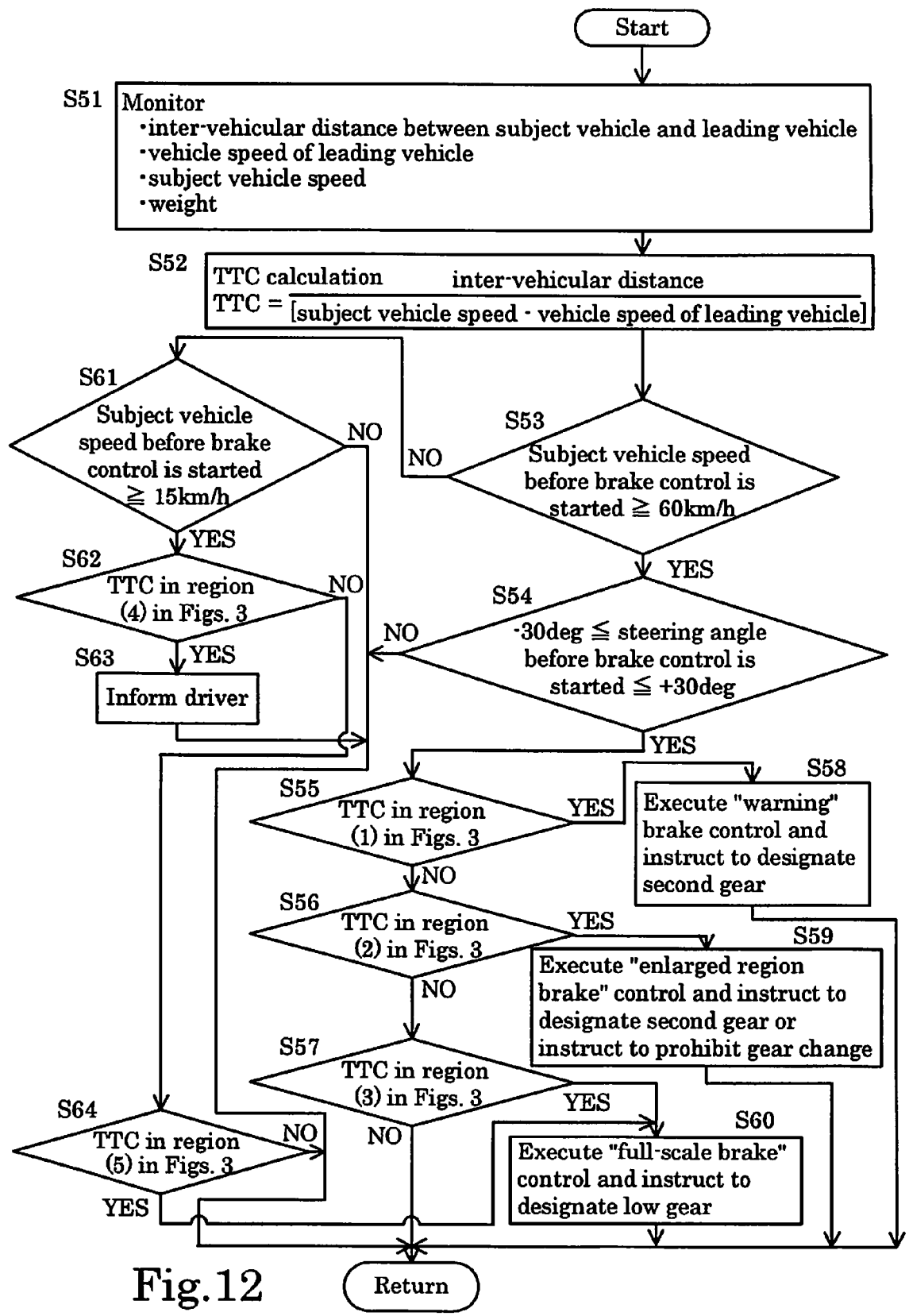
FIG. 12 is a flowchart showing control procedure of a brake control ECU of a fourth embodiment.
Figure 13:
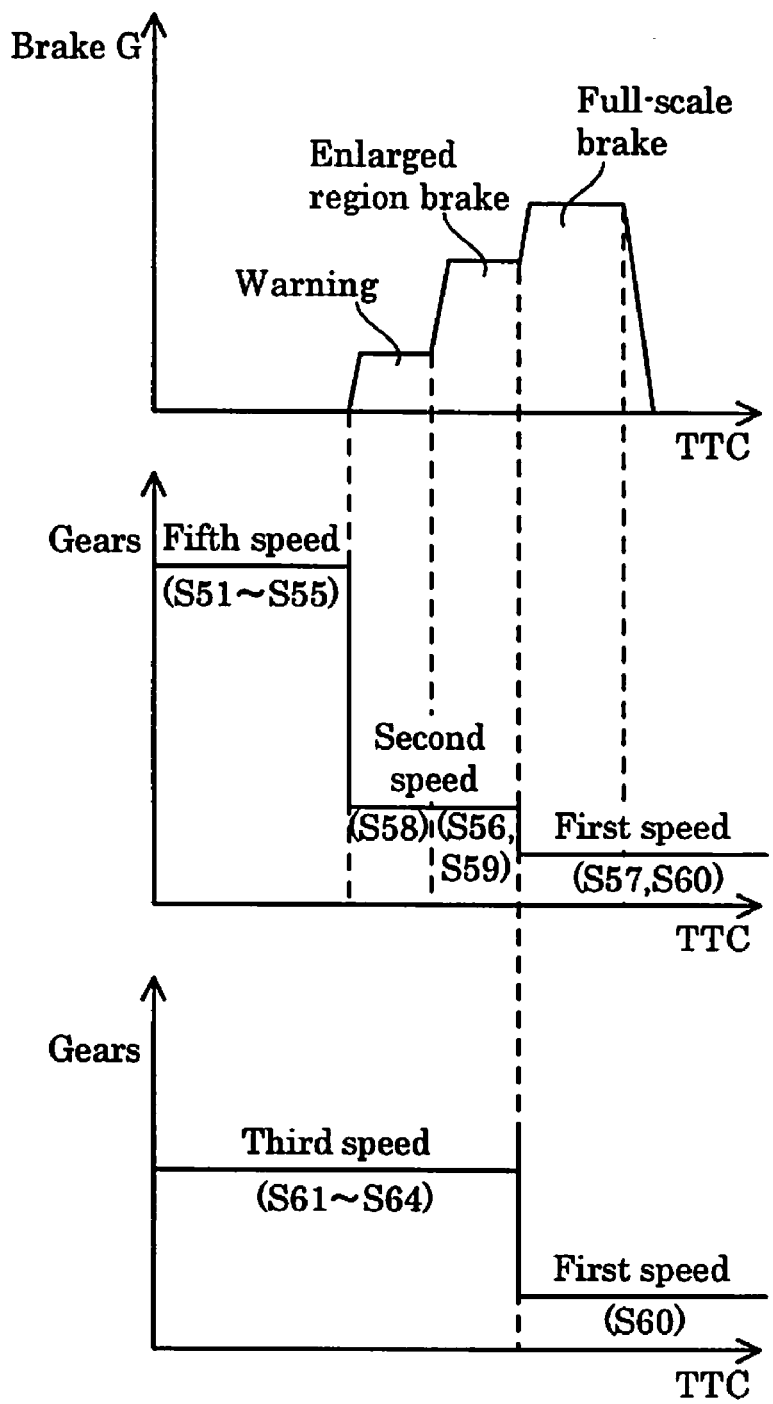
FIG. 13 is a time chart showing a relation between brake control and speed change control of the fourth embodiment.

A fourth embodiment will be explained with reference to FIGS. 12 and 13. FIG. 12 is a flowchart showing control procedure of a brake control ECU of the fourth embodiment. FIG. 13 is a time chart showing a relation between brake control and speed change control of the fourth embodiment.

This embodiment is a modification of the third embodiment. If the subject vehicle speed before brake control is started is 60 km/h or more (S53), if the steering angle before the brake control is started is equal to or less than +30 degrees and equal to or more than −30 degrees (S54) and if the TTC is in the region (1) in FIG. 3a (S55), the "warning" brake control is carried out and an instruction for changing the gear to the second speed (second gear) is sent to the speed change control ECU 14 (S58). If the TTC is in the region (2) shown in FIG. 3a (S56), the "enlarged region brake" control is carried out and an instruction for changing the gear to the second speed or a gear change prohibiting instruction is sent to the speed change control ECU 14 (S59). If the TTC is in the region (3) shown in FIG. 3a (S57), the "full-scale brake" control is carried out and an instruction for changing the gear to the first speed (low gear) is sent to the speed change control ECU 14 (S60).

If the subject vehicle speed before the brake control is started is less than 60 km/h and 15 km/h or more (S53, S61) and if the TTC is in the region (4) shown in FIG. 3c (S62), a driver is informed that a relative distance from the leading vehicle is short (S63). The driver is informed by means of an alarm display or a buzzer sound. If the TTC is in the region (5) shown in FIG. 3c (S64), the "full-scale brake" control is carried out and an instruction for changing the gear to first gear (low gear) is sent to the speed change control ECU 14 (S60).

In this embodiment, unlike the third embodiment, the gear is changed down to the second speed (second gear) in the "warning" stage, the second speed is maintained, and in the "full-scale brake" stage, the gear is changed down to the first speed (low gear). With this, when compared with the third embodiment, the hard braking tendency can be moderated.

Figure 14:
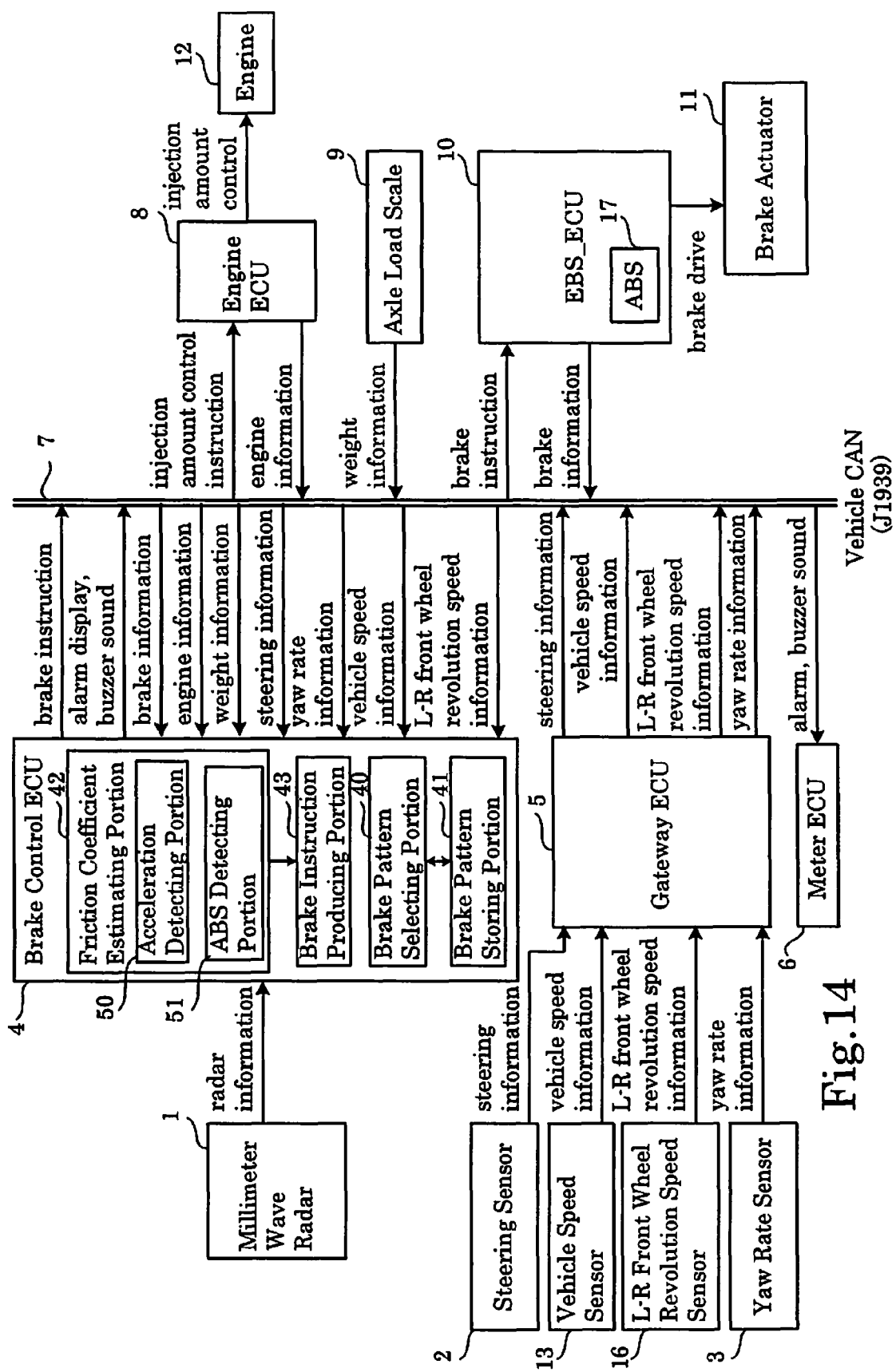
FIG. 14 is a block diagram of a control system of a fifth embodiment.
Figure 15:
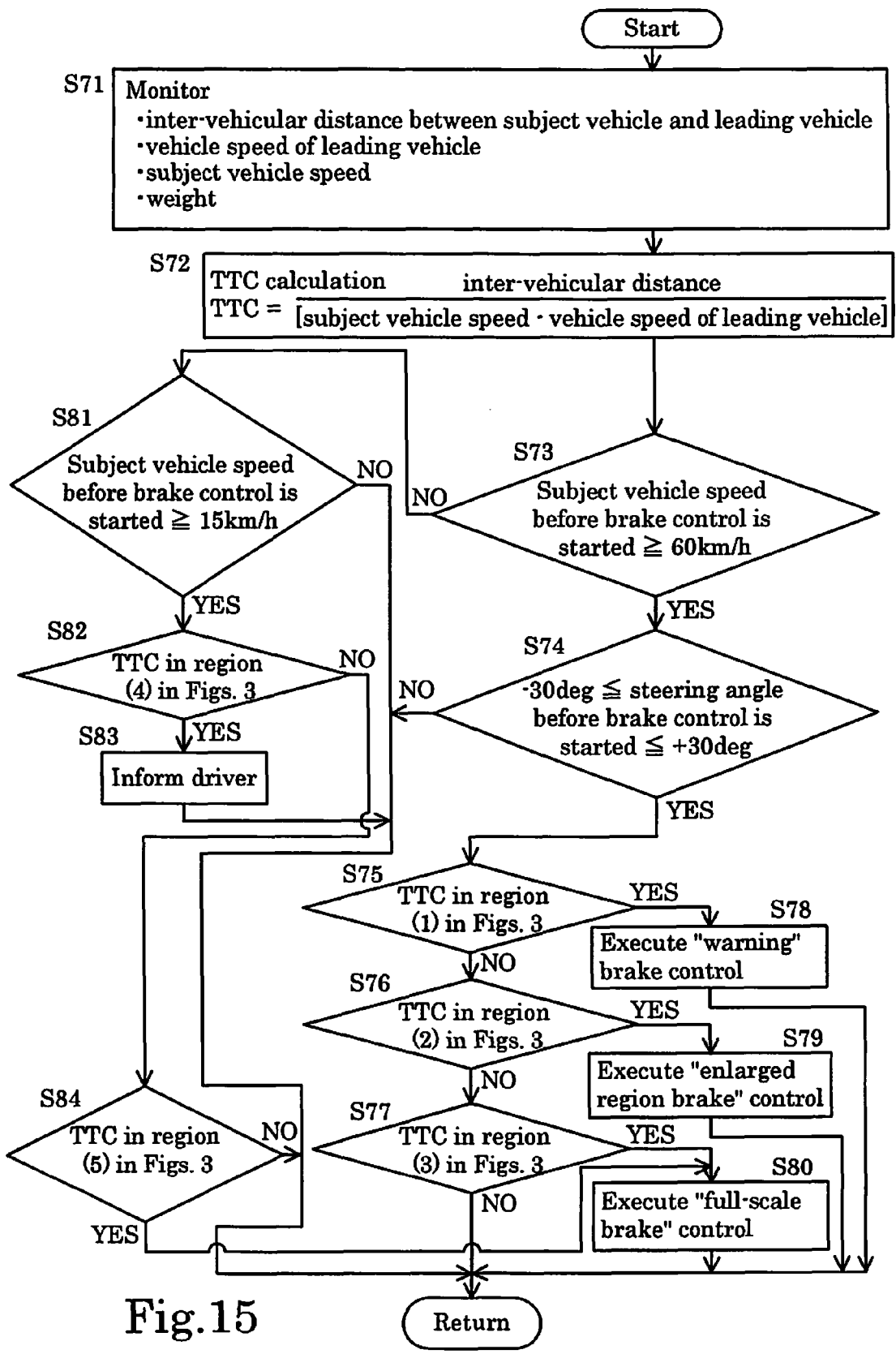
FIG. 15 is a flowchart showing control procedure of a brake control ECU of the fifth embodiment.
Figure 16:
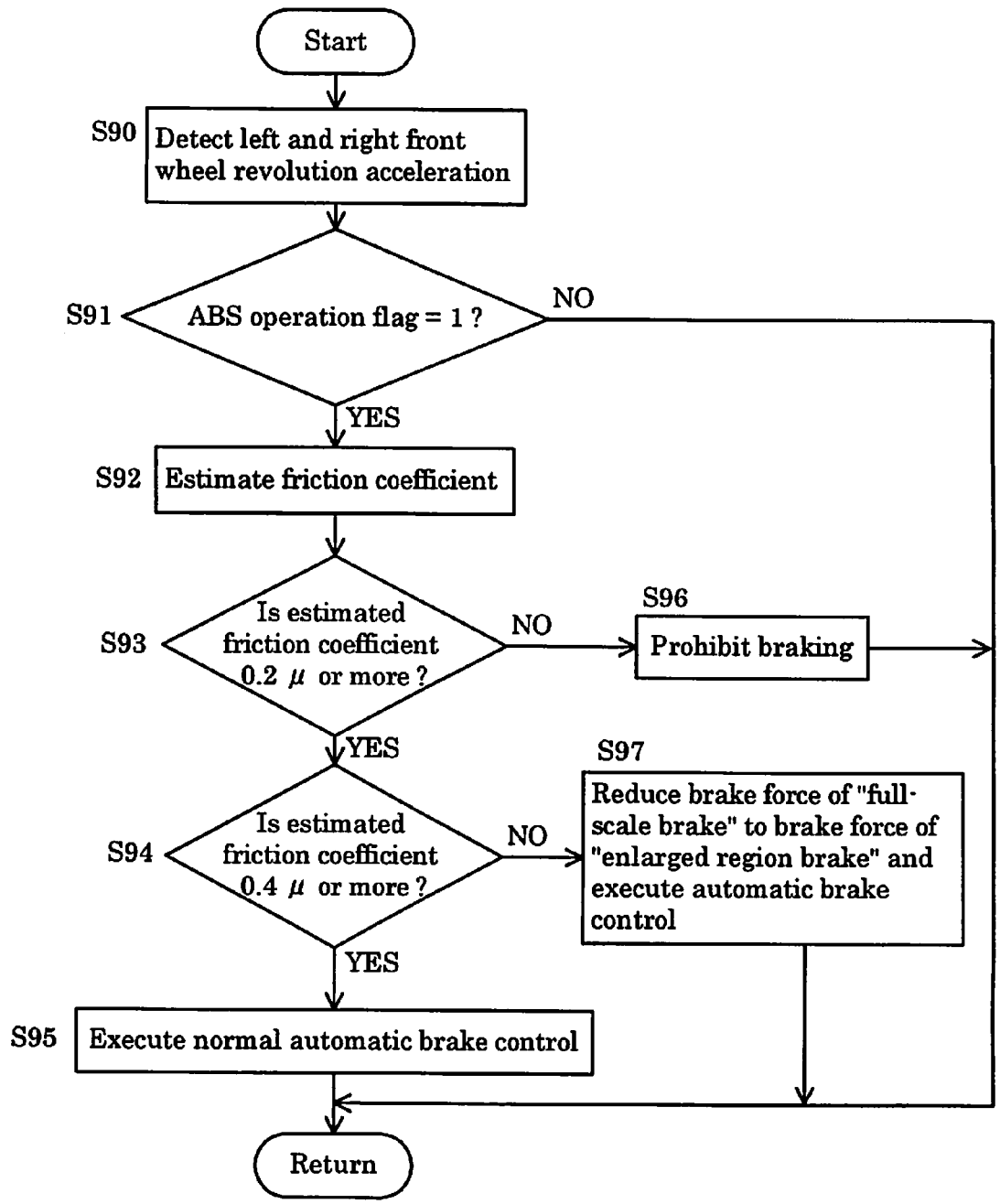
FIG. 16 is a flowchart showing adjusting procedure of a brake force in accordance with a friction coefficient of the fifth embodiment.
Figure 17:
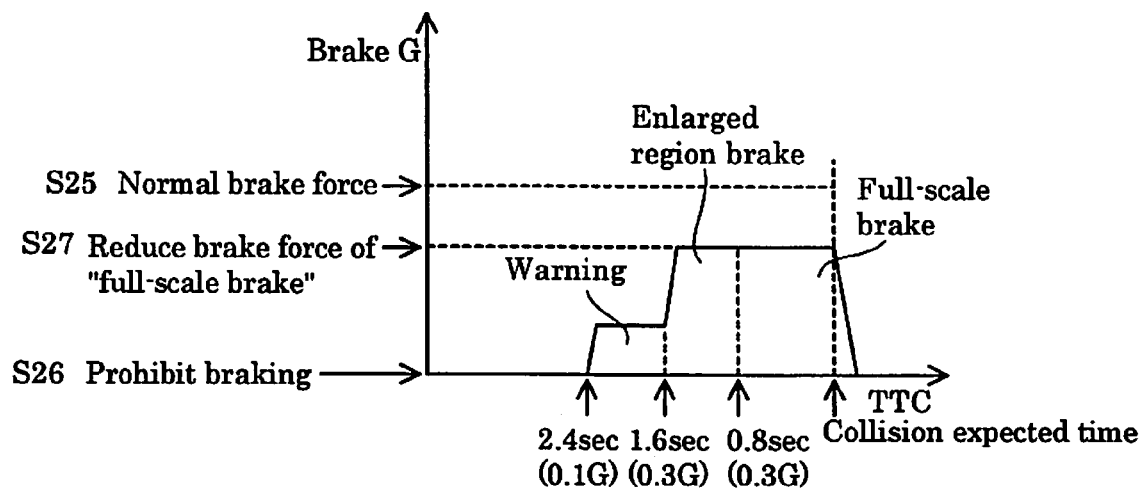
FIG. 17 is a diagram showing a brake pattern in which a brake force of "full-scale brake" is reduced to a brake force of "enlarged region brake" of the fifth embodiment.
Figure 18:
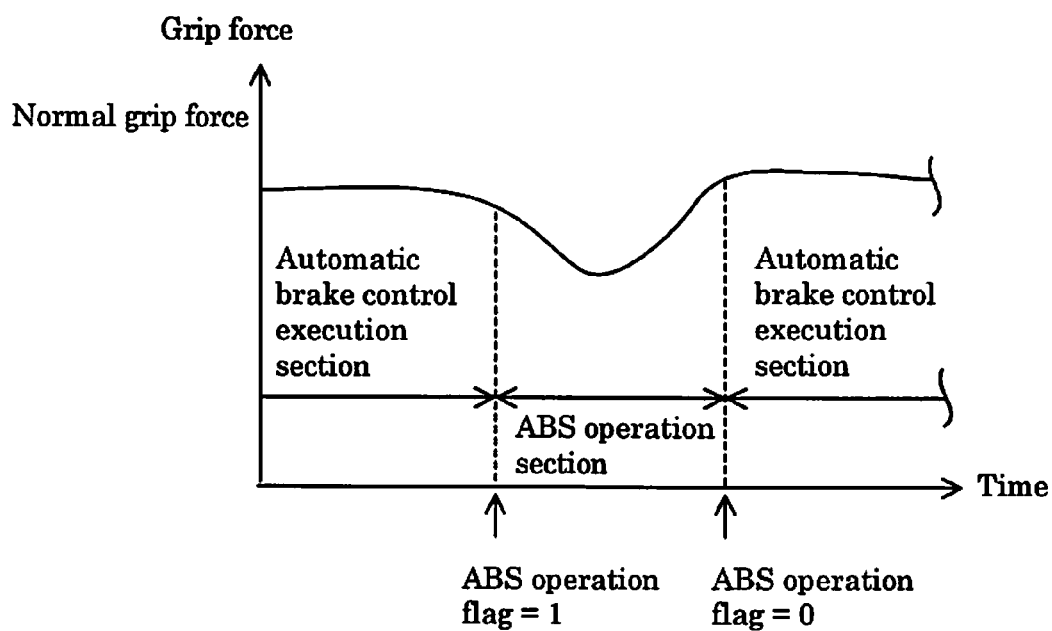
FIG. 18 is a diagram showing a relation between an ABS operation flag and an ABS operation portion of the fifth embodiment.
Figure 19:
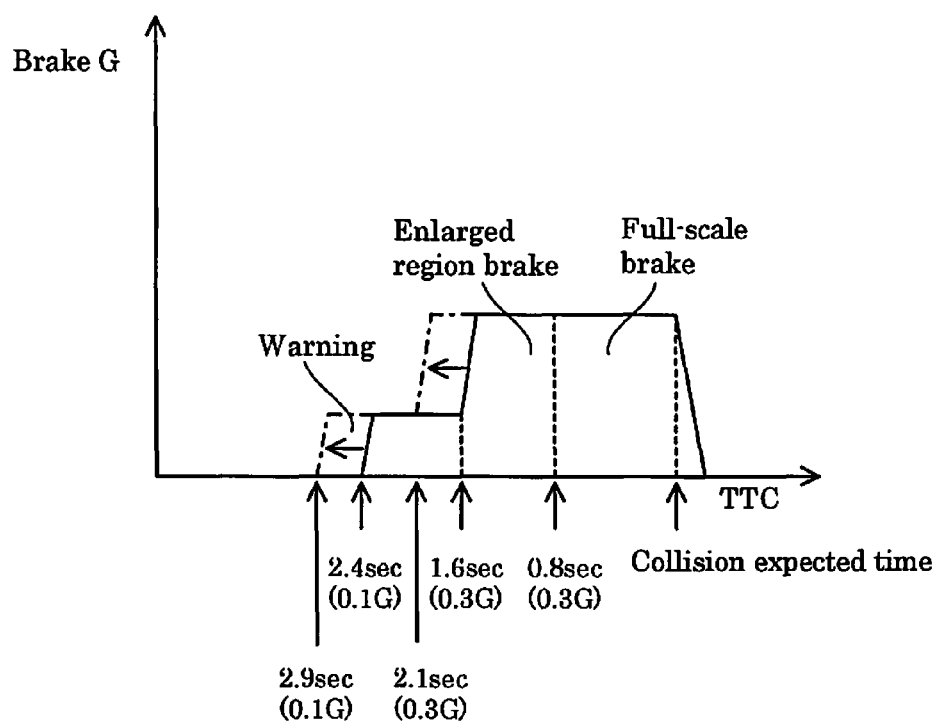
FIG. 19 is a diagram showing a brake pattern in which a TTC set value is increased according to the fifth embodiment.

An automatic brake control device of a fifth embodiment will be explained with reference to FIGS. 14 to 17. FIG. 14 is a block diagram of a control system of the embodiment. FIG. 15 is a flowchart showing an operation of a brake control ECU of the embodiment. FIG. 16 is a flowchart showing adjusting procedure of a brake force in accordance with a friction coefficient of the embodiment. FIG. 17 is a diagram showing a control pattern in which a brake force of "full-scale brake" is reduced to a brake force of "enlarged region brake" of the embodiment. FIG. 18 is a diagram showing a relation between an ABS operation flag and an ABS operation portion of the embodiment. FIG. 19 is a diagram showing a control pattern in which a TTC set value is increased according to the embodiment.

In the structure of the control system of the embodiment shown in FIG. 14, the speed change control ECU 14 and the transmission 15 of the structure of the control system of the first embodiment shown in FIG. 1 are removed, and left and right front wheel revolution speed sensors 16 and an ABS 17 are added. Redundant explanation concerning the same structure of the control system of the embodiment as that of the first embodiment will be omitted.

The left and right front wheel revolution speed sensors 16 are connected to the VehicleCAN(J1939)7 through the gateway ECU 5, and the sensor information is taken into the brake control ECU 4. The EBS_ECU 10 includes a function of the ABS 17.

Next, the operation of the automatic brake control device will be explained with reference to a flowchart in FIG. 15. In FIG. 2, the explanation is based on the brake pattern at the time of no-load (FIG. 3), but performance at the time of semi-load (FIG. 4) or at the time of constant-load (FIG. 5) is also carried out in accordance with the flowchart in FIG. 15. As shown in FIG. 15, the millimeter wave radar 1 measures and monitors an inter-vehicular distance from a leading vehicle and a vehicle speed of the leading vehicle. The vehicle speed sensor 13 measures and monitors the subject vehicle speed. The axle load scale 9 measures and monitors the weight of cargo or passengers (S71). The control pattern selecting portion 40 previously selects one of control patterns (FIGS. 3 to 5) based on the measuring result of the weight. The following explanation is based on an example in which the control pattern in FIG. 3 is selected.

The TTC is calculated by the inter-vehicular distance, the subject vehicle speed and the vehicle speed of a leading vehicle (S72). The calculation method is as described above. If the subject vehicle speed before brake control is started is 60 km/h or more (S73), if the steering angle before the brake control is started is equal to or less than +30 degrees and equal to or more than −30 degrees (S74) and if the TTC is in the region (1) shown in FIG. 3a (S75), the "warning" brake control is carried out (S78). If the TTC is in the region (2) shown in FIG. 3a (S76), the "enlarged region brake" control is carried out (S79). If the TTC is in the region (3) shown in FIG. 3a (S77), the "full-scale brake" control is carried out (S80).

If the subject vehicle speed before the brake control is started is less than 60 km/h and 15 km/h or more (S73, S81) and if the TTC is in the region (4) shown in FIG. 3c (S82), a driver is informed that a relative distance from the leading vehicle is short (S83). The driver is informed by means of an alarm display or a buzzer sound. If the TTC is in the region (5) shown in FIG. 3c (S84), the "full-scale brake" control is carried out (S80).

It is also possible to utilize a yaw rate from the yaw rate sensor 3 instead of the steering angle from the steering sensor 2. Alternatively, both the steering angle and the yaw rate may be used.

The brake control ECU 4 includes a friction coefficient estimating portion 42 which estimates a state of a friction coefficient between a road surface and a tire in accordance with the procedure shown in FIG. 16, and a brake force adjusting portion 43 which instructs to apply brake based on the estimation result of the friction coefficient estimating portion 42 and adjusts a brake force. The brake reduction speed may be adjusted instead of adjusting the brake force. In this embodiment, the adjusting operation of the brake force will be explained.

The friction coefficient estimating portion 42 includes an acceleration detecting portion 50 which detects revolution accelerations of the left and right front wheels based on the left and right front wheel revolution speed information taken from the left and right front wheel revolution speed sensor 16, and an ABS detecting portion 51 which detects an operation state of the ABS 17 which is a function of the EBS_ECU 10. A brake instruction producing portion 43 of the brake control ECU 4 instructs the EBS_ECU 10 to apply brake to reduce the brake force to a predetermined value in accordance with a difference between an acceleration detected by the acceleration detecting portion 50 while the ABS detecting portion 51 detects the operation of the ABS and an acceleration detected by the acceleration detecting portion 50 before the ABS detecting portion 51 detects the operation of the ABS.

Next, procedure of the embodiment of the adjustment of a brake force in accordance with a friction coefficient will be explained with reference to FIG. 16. The acceleration detecting portion 50 of the brake control ECU 4 detects the revolution accelerations of the left and right front wheels (S90). Here, the detection of acceleration by the acceleration detecting portion 50 will be explained in more detail. The acceleration detecting portion 50 takes in the left and right front wheel revolution speed information from the left and right front wheel revolution speed sensors 16 for every operation state detecting cycle of the ABS 17. For example, if the operation state detecting cycle of the ABS 17 is 50 ms, the left and right front wheel revolution speed information is also taken in every 50 ms.

A left or right front wheel revolution speed which is taken this time is subtracted from a left or right front wheel revolution speed which is taken previously, a result thereof is divided by a time difference between time at which the previous left or right front wheel revolution speed information was taken and time at which the left or right front wheel revolution speed information was taken this time, and a left or right front wheel revolution acceleration can be obtained.

In this embodiment, a left or right front wheel revolution speed which is taken this time is subtracted from a left or right front wheel revolution speed which is taken for the last sixth time, a result thereof is divided by a time difference (50 ms*6=300 ms) between time at which the previous left or right front wheel revolution speed information was taken for the last sixth time and time at which the left or right front wheel revolution speed information was taken this time, and a left or right front wheel revolution acceleration is obtained. With this, as compared with a case in which a left or right front wheel revolution speed which is taken this time is subtracted from a left or right front wheel revolution speed which is just taken, change in revolution speed can be reflected efficiently. The acceleration detecting portion 50 detects the revolution accelerations of the left and right front wheels in this manner.

Here, when idling (slip) of the wheel is generated, the ABS 17 is operated and the ABS operation flag is set (=1) (S91), the ABS detecting portion 51 detects this state. A degree of the idling is recognized and a friction coefficient is estimated by checking a difference between the revolution accelerations of the left and right front wheels when the ABS operation flag=1 and the revolution accelerations of the left and right front wheels when the ABS operation flag=0 (when ABS is not operated). A principle thereof will be explained briefly. It can be estimated that as the difference between the acceleration before the ABS operation flag is set (=0) and the acceleration after the flag is set (=1) is greater, the degree of the idling is greater. Therefore, it can be estimated that the friction coefficient is smaller.

FIG. 18 shows a relation between the state of the ABS operation flag and the ABS operation portion. In FIG. 18, the horizontal axis shows time and the vertical axis shows a grip force between the tire and the road surface. A reason why a revolution acceleration of the front wheel is detected is that a barycenter of a vehicle is deviated toward the front wheels and under such situation, the front wheels are less prone to slip as compared with rear wheels and a probability of erroneous determination is low.

Here, the automatic brake control is carried out in three stages, i.e., a stage in which the estimated friction coefficient is less than 0.2μ, a stage in which the estimated friction coefficient is 0.2μ or higher and less than 0.4μ, and a stage in which the estimated friction coefficient is 0.4μ or more. If the estimated friction coefficient is less than 0.2μ (S93), the braking is prohibited (S96). That is, a situation in which the friction coefficient is less than 0.2μ is a situation in which large slip is generated on a snow road for example and thus, a brake force generated by the automatic brake control is once released, and the braking operation is left to a driver.

If the estimated friction coefficient is 0.2μ or more and less than 0.4μ (S93, S94), the automatic brake control can be performed, but it is not preferable to use a great brake force like the "full-scale brake" because a limit value of a grip force between a road surface and a tire is low. In such a case, a brake force of the "full-scale brake" is reduced to a brake force of the "enlarged region brake" and the automatic brake control is carried out (S97). FIG. 17 shows a control pattern of this case. Although the FIG. 17 is based on the control pattern at the time of no-load shown in FIG. 3, since a brake force of the "full-scale brake" is reduced to a brake force of the "enlarged region brake" as shown in FIG. 17, the control pattern is substantially equal to a brake control of two stages.

FIG. 19 shows a control pattern in which a set value of the TTC is increased. When the estimated friction coefficient is 0.2μ or more and less than 0.4μ and a road surface is slippery, if a control pattern in which the set value of TTC is larger than that of the control pattern in FIG. 17 is used, a brake distance becomes longer as compared with the control pattern in FIG. 17 and this is advantageous. Therefore, in step S97, a brake force of the "full-scale brake" is reduced to a brake force of the "enlarged region brake" and the automatic brake control is performed, and in addition, a control pattern in which the set value of the TTC is increased may be selected.

If the estimated friction coefficient is 0.4μ or more (S94), a normal automatic brake control shown in FIG. 3 is performed (S95).

In this embodiment, a friction coefficient of a road surface is estimated based on the relation between the detection of the revolution accelerations of the left and right front wheels and the ABS operation flag, but all of existing techniques may be used for estimating a friction coefficient of a road surface.

Figure 20:
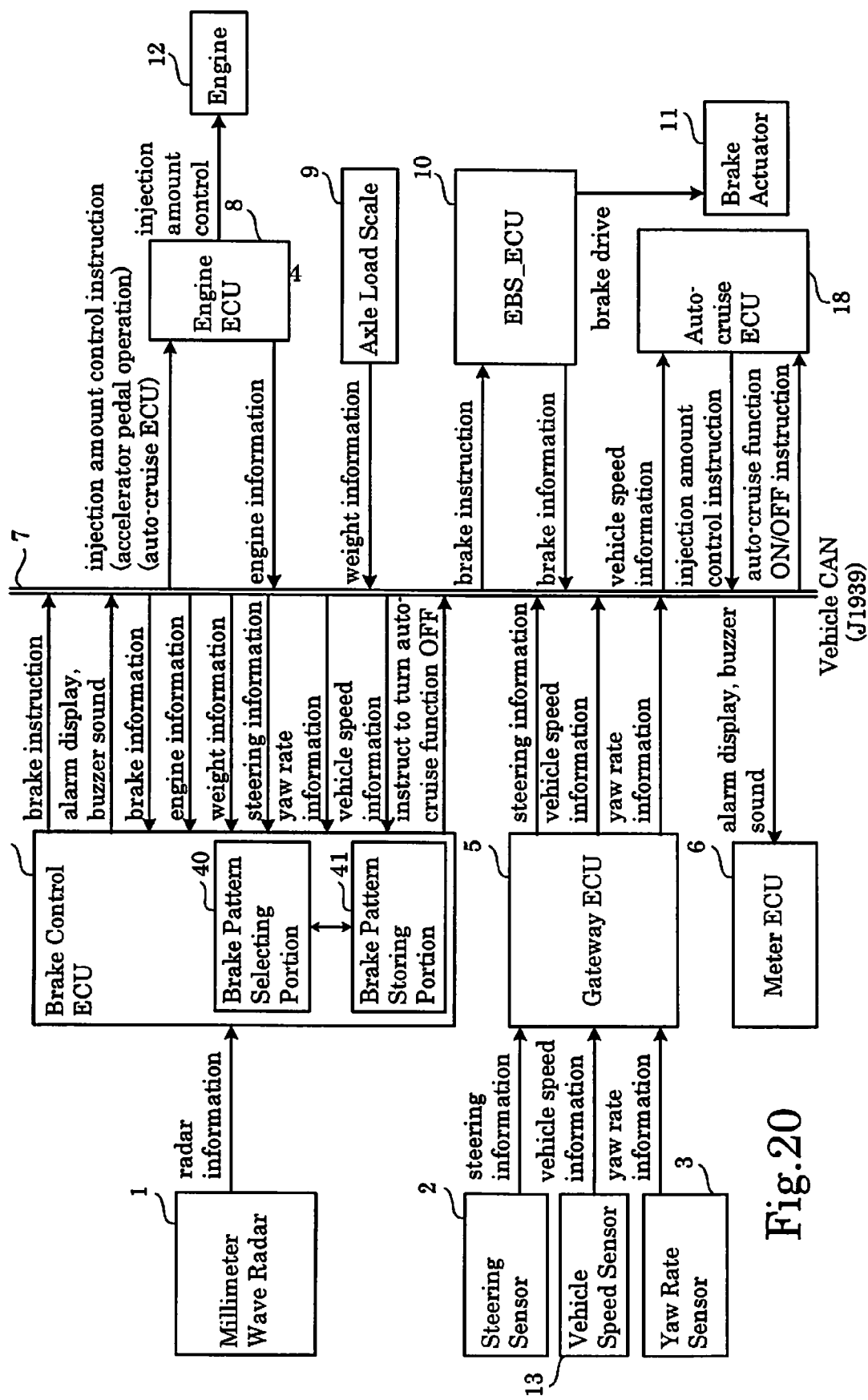
FIG. 20 is a block diagram of a control system of a sixth embodiment.
Figure 21:
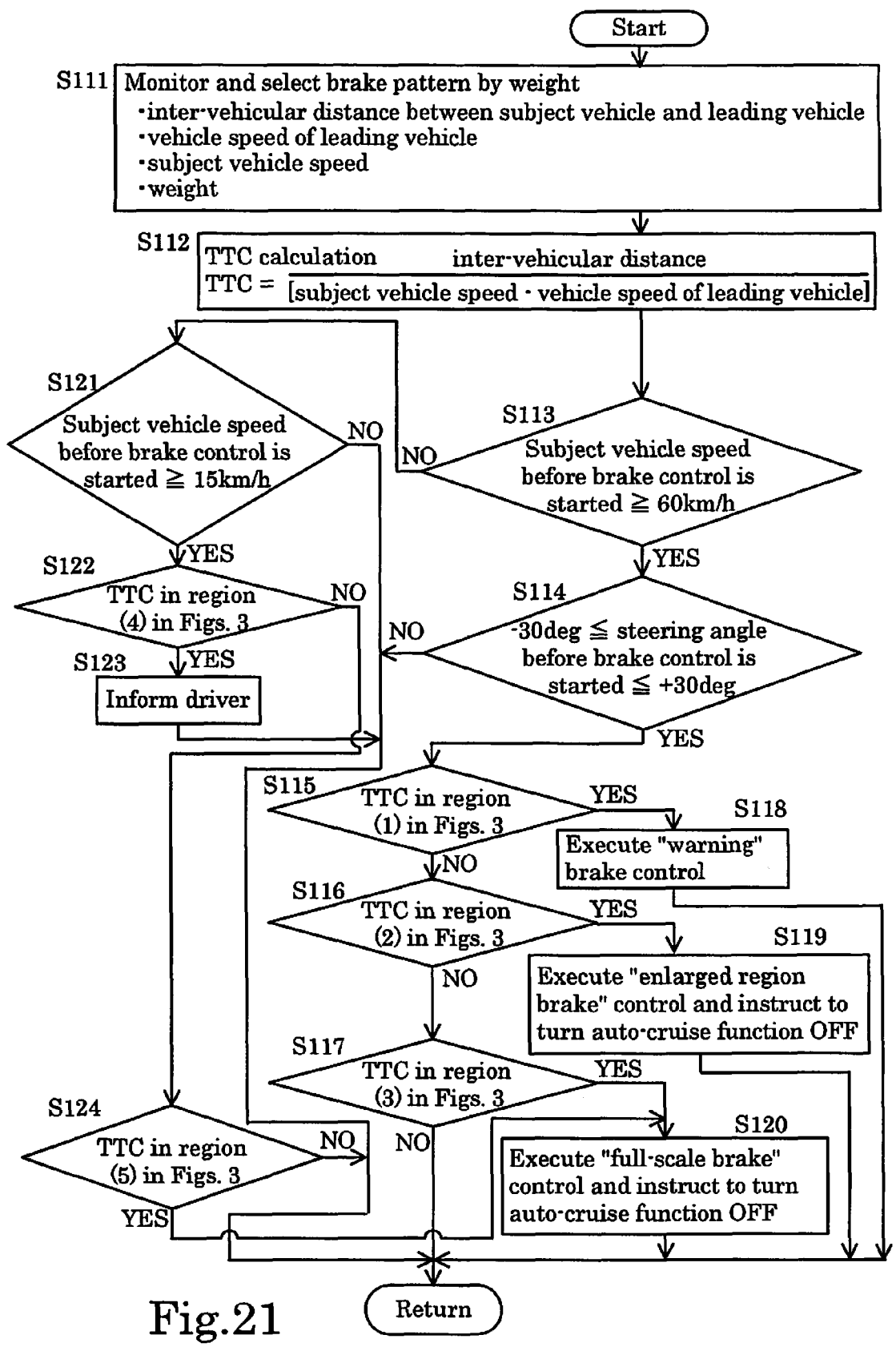
FIG. 21 is a flowchart showing control procedure of a brake control ECU of the sixth embodiment.
Figure 22:
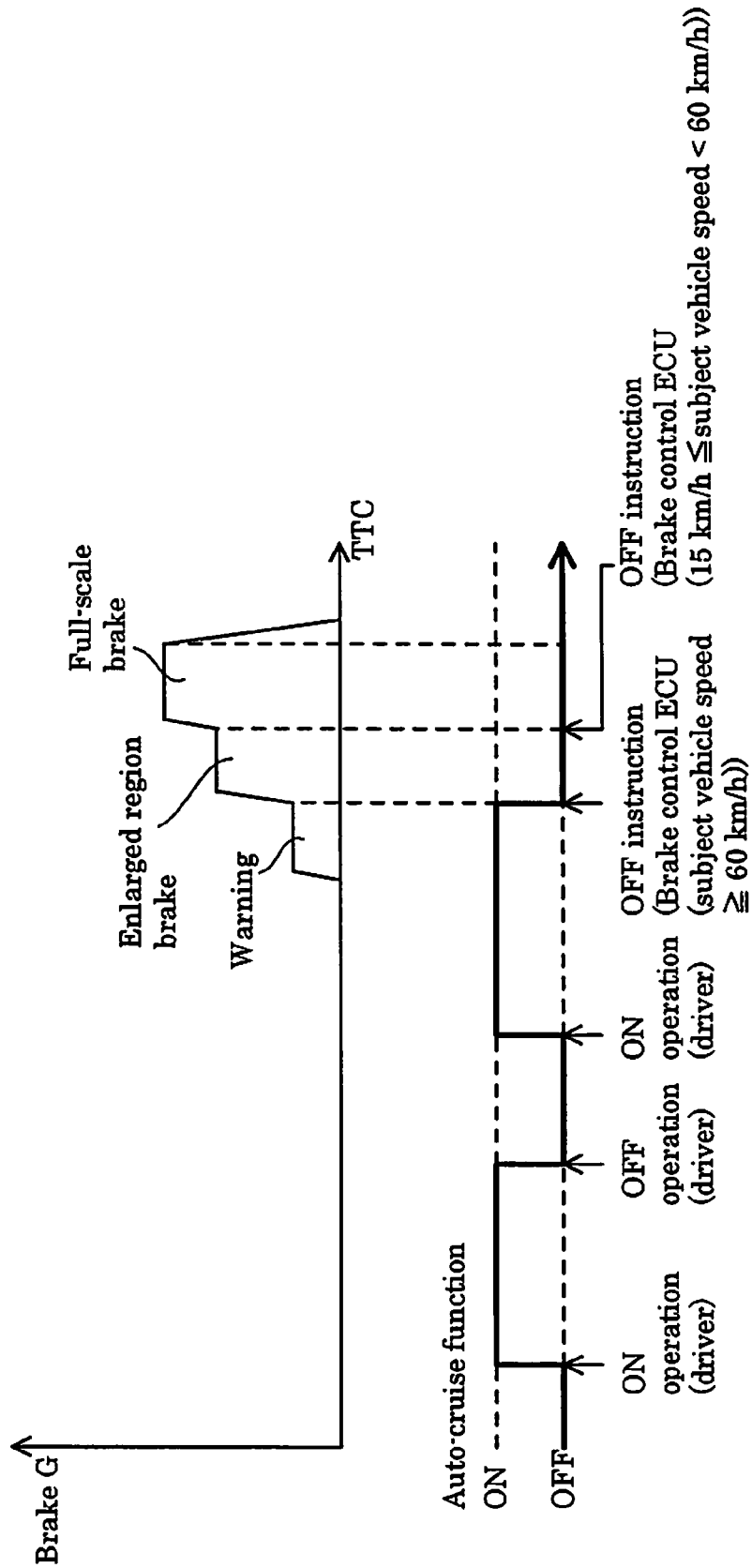
FIG. 22 is a time chart for explaining a competition state between an automatic brake control function and an auto-cruise function of the sixth embodiment.

An automatic brake control device of a sixth embodiment will be explained with reference to FIGS. 20 to 22. FIG. 20 is a block diagram of a control system of the embodiment. FIG. 21 is a flowchart showing control procedure of a brake control ECU of the embodiment. FIG. 22 is a time chart for explaining a competition state between the automatic brake control function and an auto-cruise function of the embodiment.

In a structure of a control system of the embodiment shown in FIG. 20, the speed change control ECU 14 and the transmission 15 of the first embodiment shown in FIG. 1 are removed, and an auto-cruise ECU 18 is added. Redundant explanation concerning the same structure of the control system of the embodiment as that of the first embodiment will be omitted.

As shown in FIG. 20, the auto-cruise ECUs 18 are connected to each other through the VehicleCAN(J1939)7. A fuel injection amount control instruction with respect to the engine ECU 8 is output by acceleration pedal operation at the driver's seat and the auto-cruise ECU 18. The auto-cruise ECU 18 maintains a predetermined subject vehicle speed in accordance with an operation input from the driver's seat.

An auto-cruise function ON/OFF instruction with respect to the auto-cruise ECU 18 is given by an operation input from the driver's seat. The auto-cruise function OFF instruction is given also by the brake control ECU 4. If the auto-cruise function ON instruction is input, the auto-cruise ECU 18 receives the vehicle speed information from the vehicle speed sensor 13, and gives a fuel injection amount control instruction to the engine ECU 8 such that the subject vehicle speed becomes equal to a set value.

When the stepwise brake control is being carried out, the brake control ECU 4 sends the auto-cruise function OFF instruction to the auto-cruise ECU 18 to cancel the maintenance of the subject vehicle speed by the auto-cruise ECU 18 in each of the "enlarged region brake" stage and the "full-scale brake" stage shown in FIG. 3.

In this embodiment, a reason why the auto-cruise function OFF instruction is not sent in the first stage described "warning" shown in FIG. 3 is that TTC has a slight margin in this sage, there is a possibility that collision can be avoided by a steering wheel operation, and the necessity to bring the auto-cruise function to the OFF state is low. In the "warning" stage, a main purpose is to give a warning to a vehicle behind. Therefore, if the auto-cruise function is remained in the ON state, the deceleration of the subject vehicle speed becomes gentler as compared to the OFF state of the auto-cruise function and this is more preferable in some cases.

Therefore, in this embodiment, in the "warning" stage, the auto-cruise function is not brought into the OFF state, and the auto-cruise function is brought into the OFF state from the "enlarged region brake" stage. It is possible to employ an embodiment in which the auto-cruise function is brought into the OFF state from the "warning" stage, and this is more general. This is easily estimated, and thus, the embodiment in which the auto-cruise function is brought into the OFF state from the "enlarged region brake" stage is shown here, but this does not means that the embodiment in which the auto-cruise function is brought into the OFF state from the "warning" stage is not eliminated. An embodiment in which the auto-cruise function OFF instruction is given after the stage is brought into the "full-scale brake" stage may be employed as another embodiment.

The operation of the automatic brake control device of the embodiment will be explained with reference to a flowchart in FIG. 21. The explanation in FIG. 21 is based on the control pattern at the time of no-load (FIG. 3), but performance at the time of semi-load (FIG. 4) or at the time of constant-load (FIG. 5) is also carried out in accordance with the flowchart in FIG. 21. As shown in FIG. 21, in the brake control ECU 4, the millimeter wave radar 1 measures and monitors an inter-vehicular distance from a leading vehicle and a vehicle speed of the leading vehicle. The vehicle speed sensor 13 measures and monitors the subject vehicle speed. The axle load scale 9 measures and monitors the weight of cargo or passengers. The control pattern selecting portion 40 of the brake control ECU 4 previously selects one of control patterns (FIGS. 3 to 5) based on the measuring result of the weight (S11). The following explanation is based on an example in which the control pattern in FIG. 3 is selected.

The TTC is calculated by the inter-vehicular distance, the subject vehicle speed and the vehicle speed of a leading vehicle (S112). The calculation method is as described above. If the subject vehicle speed before brake control is started is 60 km/h or more (S113), if the steering angle before the brake control is started is equal to or less than +30 degrees and equal to or more than −30 degrees (S114) and if the TTC is in the region (1) shown in FIG. 3*a* (S115), the "warning" brake control is carried out by the brake control ECU 4 (S118). In the "warning" stage, the brake control ECU 4 instructs the EBS_ECU 10 to apply a brake force of 0.1 G, the EBS_ECU 10 drives a brake actuator 11 to apply a brake force of 0.1 G, but if the auto-cruise function is in On state at that time, the auto-cruise ECU 18 instructs the engine ECU 8 to control the injection amount of fuel (injection amount increasing instruction) so as to maintain the subject vehicle speed at a constant level to repulse the brake driving.

As described above, if the auto-cruise function remains in its ON state, the deceleration of the subject vehicle speed becomes gentler as compared with a case in which the auto-cruise function is in its OFF state. Therefore, it is more preferable that the auto-cruise function remains in its ON state in the "warning" stage to give a warning to a vehicle behind, and the necessity to bring the auto-cruise function into the OFF stage is low. Therefore, in this embodiment, the auto-cruise function is not brought into the OFF state in the "warning" stage, and the auto-cruise function is brought into the OFF state from the "enlarged region brake" state. An embodiment in which the auto-cruise function is brought into the OFF state from the "warning" stage can be employed, and this embodiment is not eliminated.

If the TTC is in the region (2) shown in FIG. 3*a* (S116), the brake control ECU 4 executes the "enlarged region brake" control and sends an auto-cruise function OFF instruction to the auto-cruise ECU 18 (S119). With this, the auto-cruise ECU 18 brings the auto-cruise function into the OFF state. Thus, the auto-cruise ECU 18 does not repulse the braking instruction of 0.3 G sent by the brake control ECU 4 to the EBS_ECU 10, and greater deceleration as compared with the "warning" stage is started.

If the TTC is in the region (3) shown in FIG. 3*a* (S117), the brake control ECU 4 executes the "full-scale brake" control and sends again the auto-cruise function OFF instruction to the auto-cruise ECU 18 (S120).

If the subject vehicle speed before the brake control is started is less than 60 km/h and 15 km/h or more (S113, S121) and if the TTC is in the region (4) shown in FIG. 3*c* (S122), a driver is informed by the brake control ECU 4 that a relative distance from the leading vehicle is short (S123). The driver is informed by means of an alarm display or a buzzer sound. If the TTC is in the region (5) shown in FIG. 3*c* (S124), the "full-scale brake" control is carried out and the auto-cruise function OFF instruction is sent to the auto-cruise ECU 18 (S120).

It is also possible to utilize a yaw rate from the yaw rate sensor 3 instead of the steering angle from the steering sensor 2. Alternatively, both the steering angle and the yaw rate may be used.

FIG. 22 is a time chart showing a competition state between the automatic brake control function and the auto-cruise function when the control procedure shown in FIG. 21 is carried out. As shown in FIG. 22, the auto-cruise function is turned ON and OFF in accordance with operation input (ON operation or OFF operation) from the driver's seat. When the ON operation is carried out, a speed to be maintained is also set.

When the automatic brake control is started, the auto-cruise function is in the OFF state in the "enlarged region brake" stage irrespective of operation input from the driver's seat.

Figure 23:
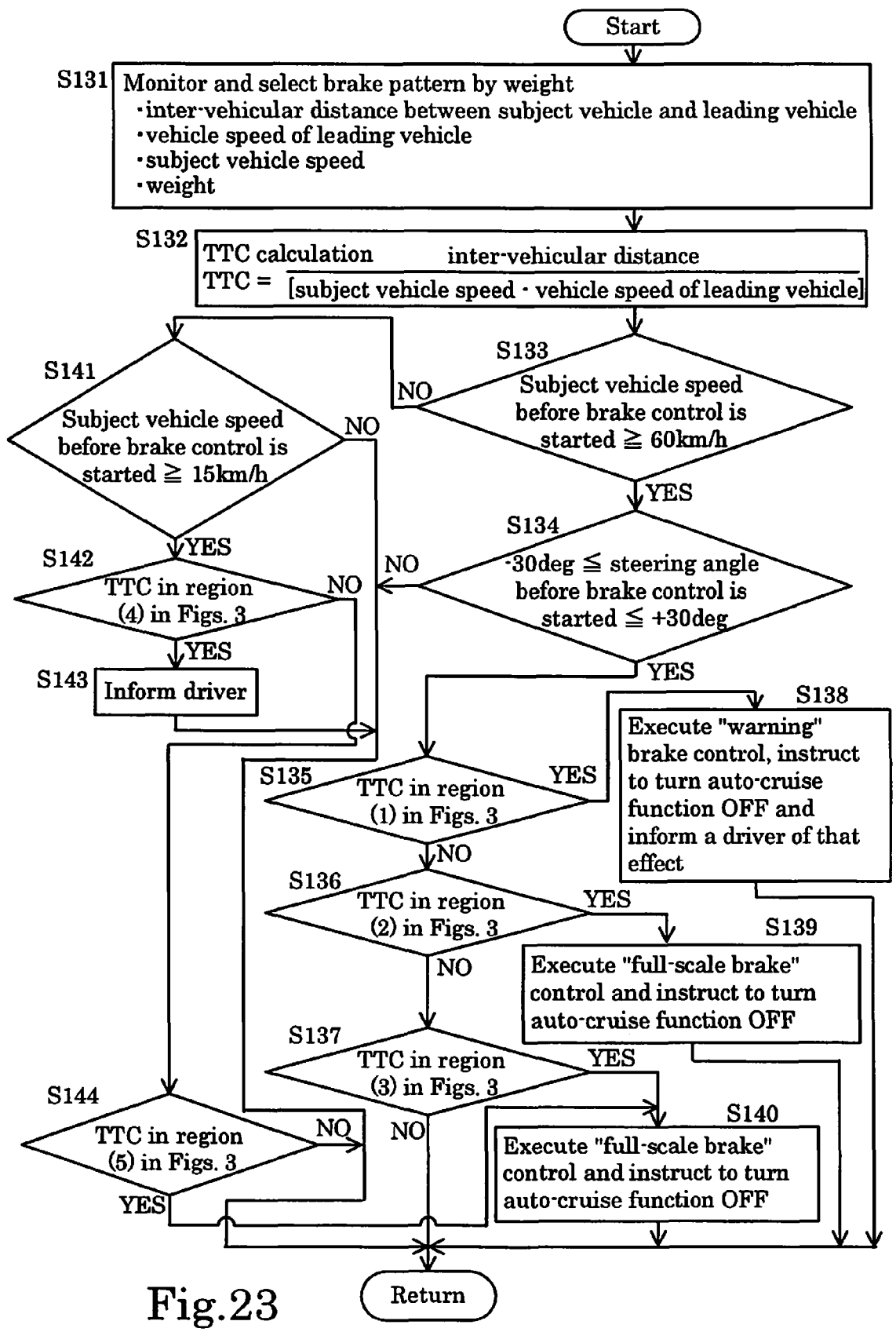
FIG. 23 is a flowchart showing control procedure of a brake control ECU of a seventh embodiment.
Figure 24:
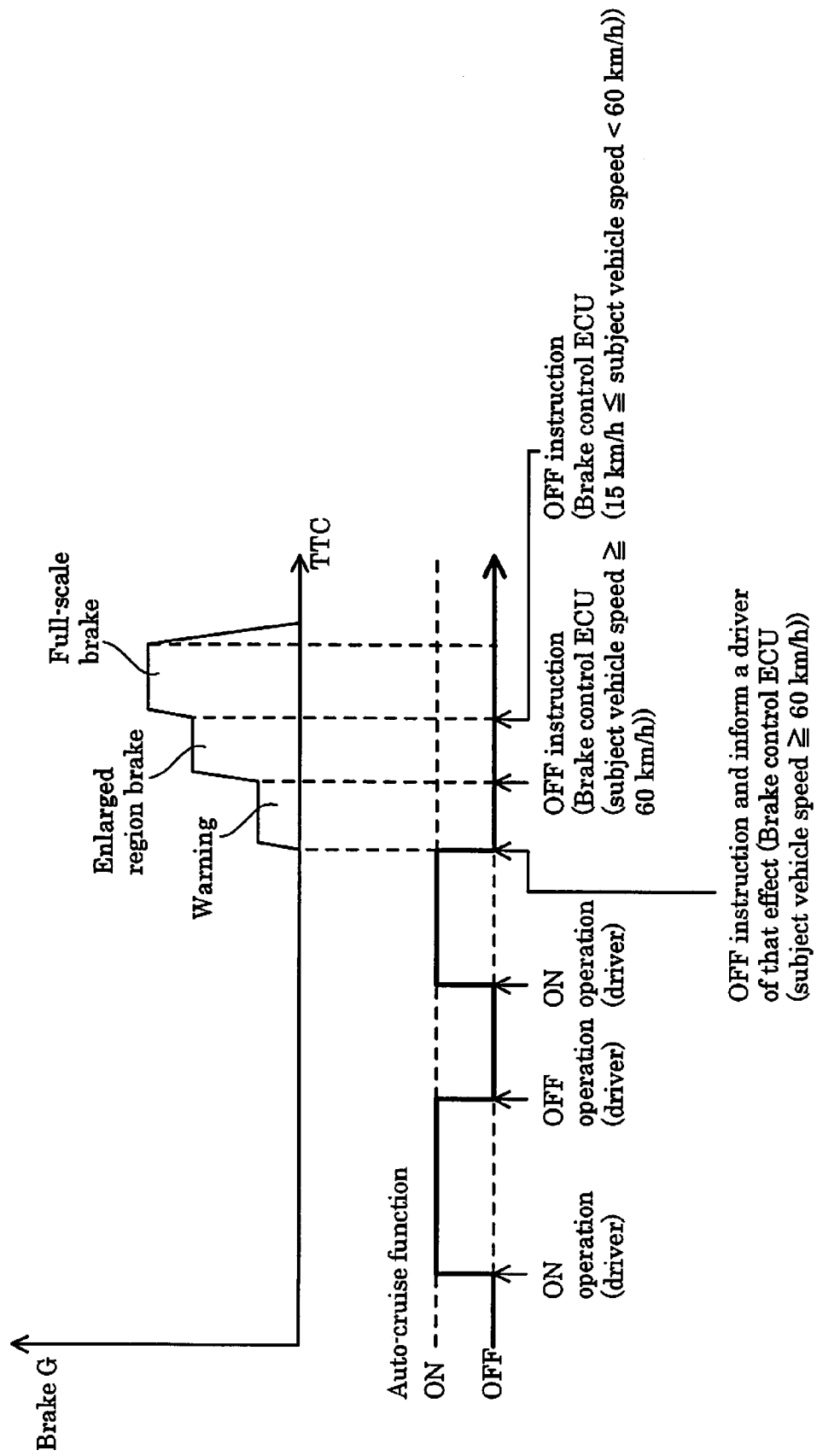
FIG. 24 is a time chart for explaining a competition state between an automatic brake control function and an auto-cruise function of the seventh embodiment.

A seventh embodiment will be explained with reference to FIGS. 23 and 24. The structure of the control system of this embodiment is the same as that of the sixth embodiment (FIG. 20). FIG. 23 is a flowchart showing control procedure of a brake control ECU of the embodiment. FIG. 24 is a time chart for explaining a competition state between the automatic brake control function and the auto-cruise function of the embodiment.

In this embodiment, when the auto-cruise ECU 18 cancels the maintenance of the subject vehicle speed, the brake control ECU 4 informs a driver of this information. That is, as shown in step S138 in FIG. 23, the brake control ECU 4 executes the "warning" brake control, instructs the auto-cruise ECU 18 to turn the auto-cruise function OFF, and informs the driver that the auto-cruise function is turned OFF through the meter ECU 6. Other operations are the same as those of the sixth embodiment.

In this embodiment, a driver is informed that the automatic brake control is started, and it is expected that the driver himself or herself avoids a collision by steering operation. Thus, the auto-cruise function is turned OFF from the "warning" stage which is the initial stage of the automatic brake control, and the driver is informed that the automatic brake control is started.

As shown in the flowchart of the sixth embodiment in FIG. 21, the auto-cruise function is turned OFF from the "enlarged region brake" stage, and at that time, the driver may be informed of that effect, but since a purpose of the warning is to avoid a collision by steering operation of a driver himself or herself, it is preferable that the warning is given at an early stage.

Figure 25:
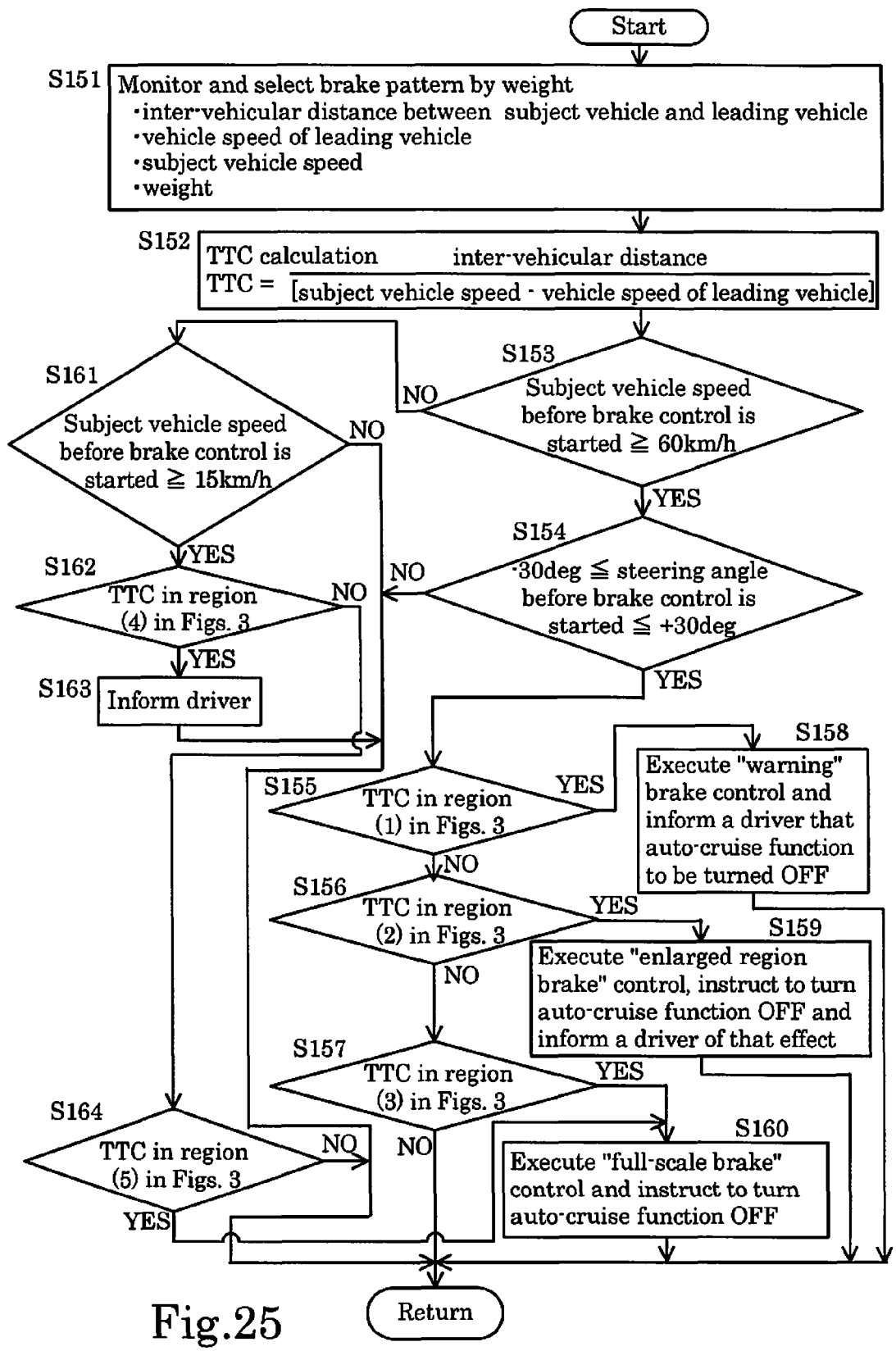
FIG. 25 is a flowchart showing control procedure of a brake control ECU of an eighth embodiment.
Figure 26:
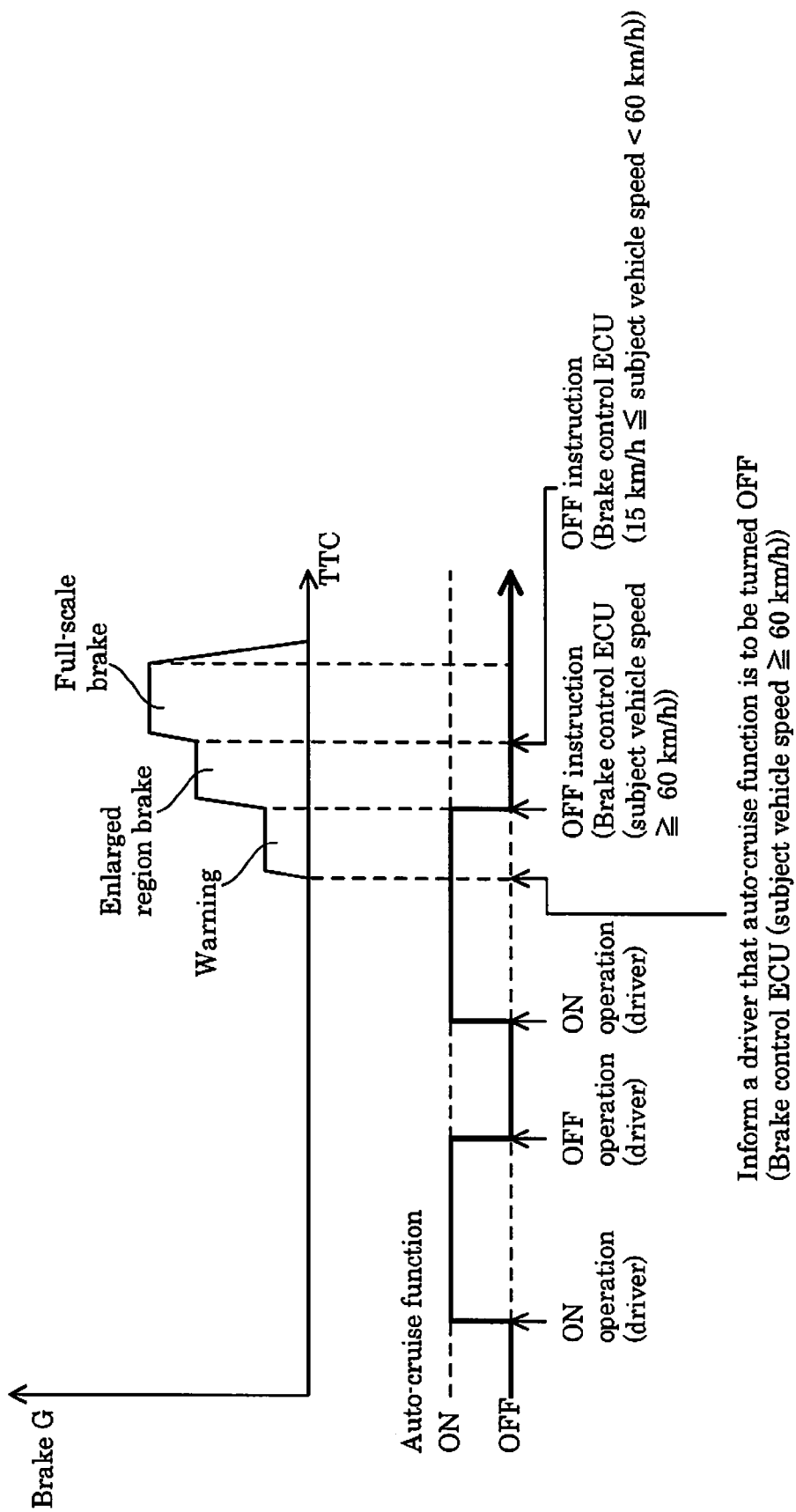
FIG. 26 is a time chart for explaining a competition state between an automatic brake control function and an auto-cruise function of the eighth embodiment.

An eighth embodiment will be explained with reference to FIGS. 25 and 26. The structure of the control system is the same as that of the sixth embodiment (FIG. 20). FIG. 25 is a flowchart showing control procedure of a brake control ECU of the embodiment. FIG. 26 is a time chart for explaining a competition state between the automatic brake control function and the auto-cruise function of the embodiment.

In this embodiment, before the auto-cruise ECU 18 cancels the maintenance of the subject vehicle speed, the brake control ECU 4 informs a driver of that effect. That is, as shown in step S158 in FIG. 25, the brake control ECU 4 executes the "warning" brake control, and informs the driver that the auto-cruise function is to be turned OFF through the meter ECU 6. As shown in step S159, the brake control ECU 4 executes the "enlarged region brake" control, instructs the auto-cruise ECU 18 to turn the auto-cruise function OFF, and informs the driver that the auto-cruise function is turned OFF through the meter ECU 6. Other operations are the same as those of the sixth embodiment.

In this embodiment, a driver is informed that the automatic brake control is started as in the seventh embodiment, and it is expected that the driver avoids a collision by his or her steering operation. Therefore, the driver is informed that the automatic brake control is started from the "warning" stage which is the initial stage of the automatic brake control. However, unlike the seventh embodiment, the auto-cruise function is not turned OFF in the "warning" stage, and the auto-cruise function is turned OFF after the state is brought into the "enlarged region brake" stage and the driver is informed of that effect as in the sixth embodiment.

As explained in the sixth embodiment, a main purpose of the "warning" stage is to give a warning to a vehicle behind the subject vehicle, and if the auto-cruise function remains in its ON state, the deceleration of the subject vehicle speed becomes gentler as compared with the case in which the auto-cruise function is in the OFF state, and this is advantageous in some cases.

Figure 27:
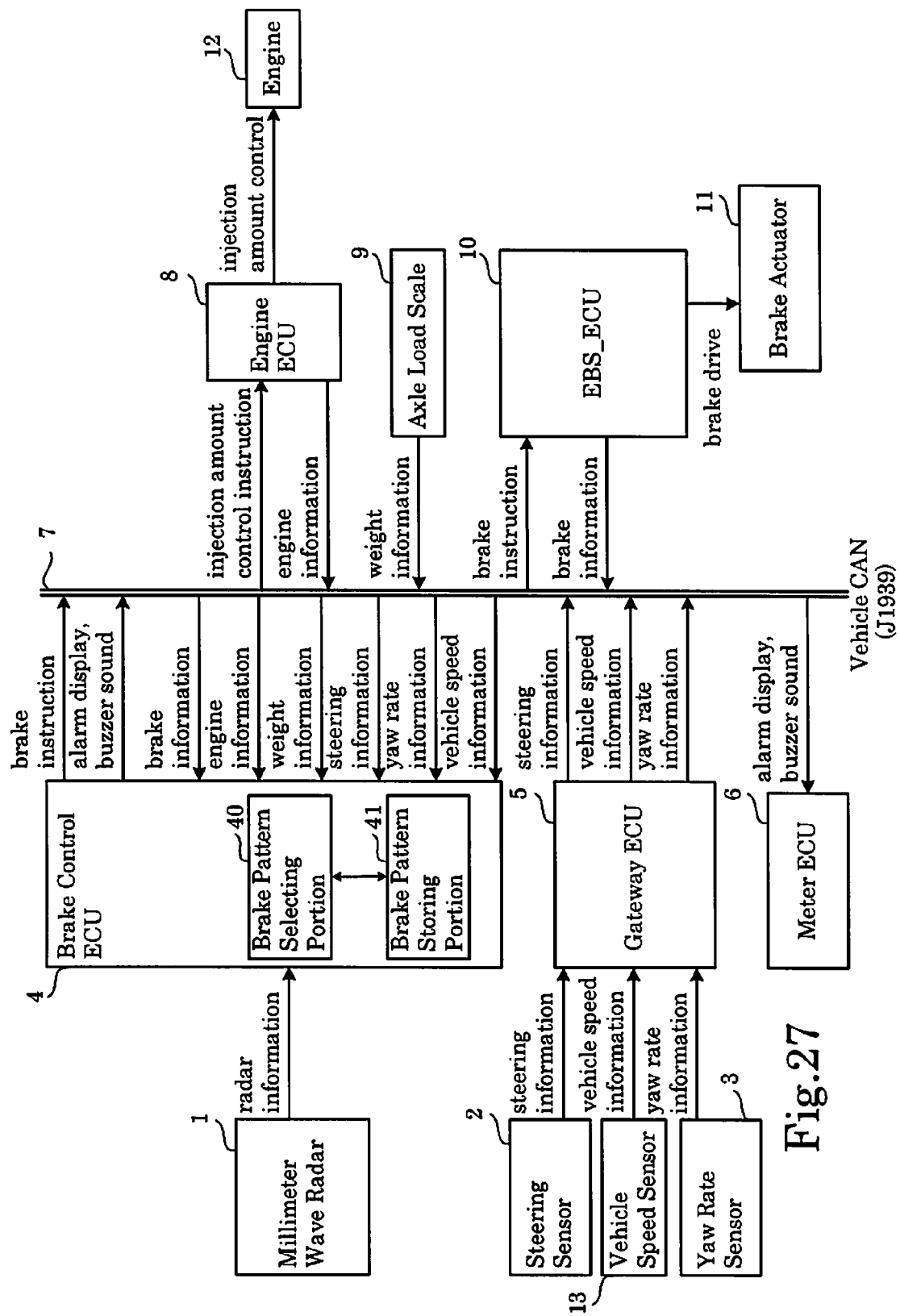
FIG. 27 is a block diagram of a control system of a ninth embodiment.
Figure 28:
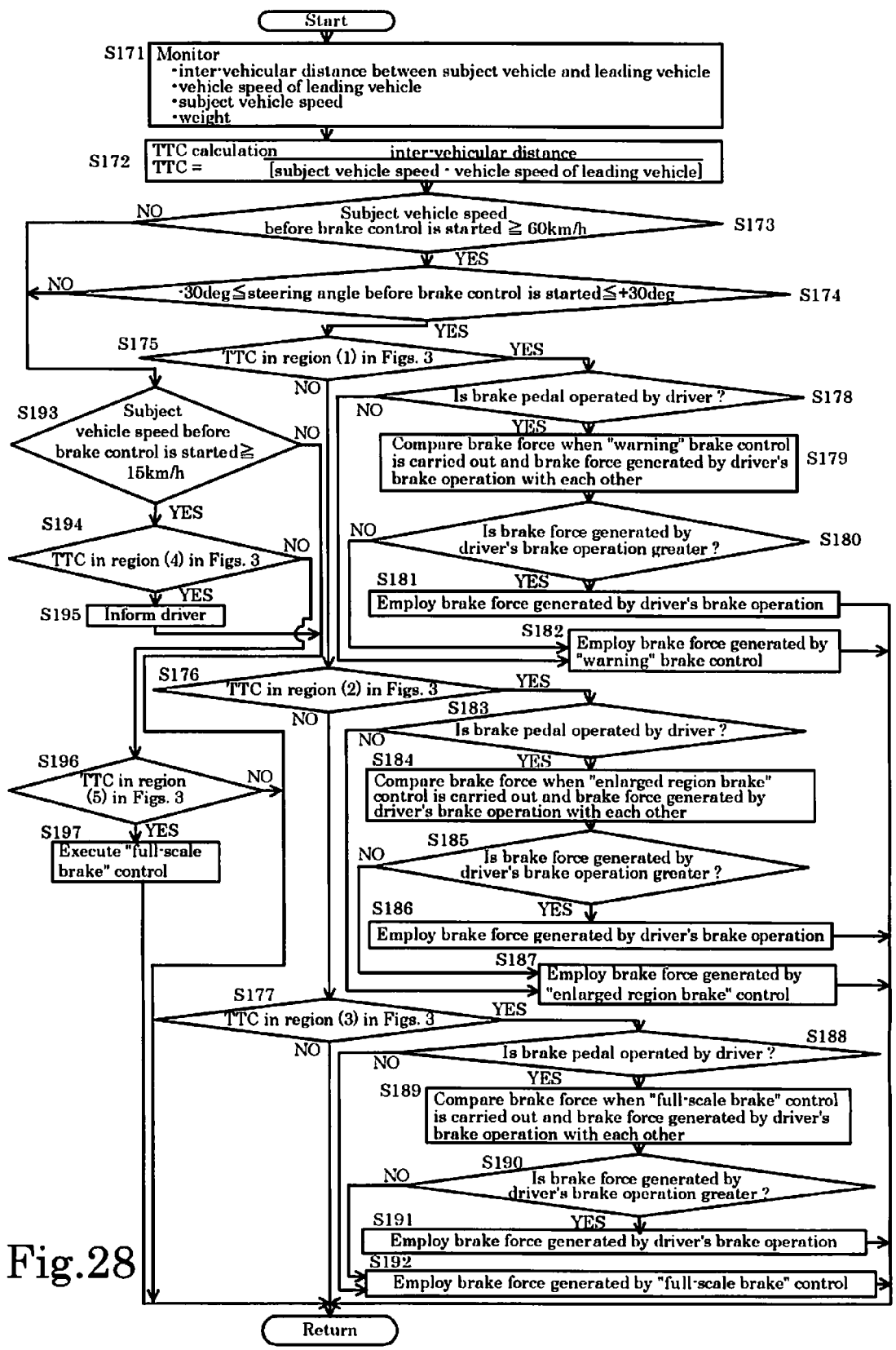
FIG. 28 is a flowchart showing control procedure of a brake control ECU of the ninth embodiment.

An automatic brake control device of a ninth embodiment will be explained with reference to FIGS. 27 and 28. FIG. 27 is a block diagram of a control system of the embodiment. FIG. 28 is a flowchart showing an operation of a brake control ECU of the embodiment.

In the structure of the control system of the embodiment shown in FIG. 27, the speed change control ECU 14 and the transmission 15 of the first embodiment shown in FIG. 1 are removed. Redundant explanation concerning the same structure of the control system of the embodiment as that of the first embodiment will be omitted.

This embodiment is characterized in that the brake control ECU 4 includes braking operation state detecting means for detecting a braking operation state of a driver, this braking operation state detecting means detects the driver's braking operation state, and when a brake force generated by the driver's braking operation is greater than a brake force generated by the brake control means, the driver's braking operation is performed with a higher priority than the stepwise brake control. The automatic brake control of the embodiment can be carried out using a brake reduction speed instead of the brake force, but an example in which the brake force is used will be explained here.

The operation of the automatic brake control device of the embodiment will be explained with reference to a flowchart shown in FIG. 28. The explanation in FIG. 28 is based on the control pattern at the time of no-load (FIG. 3), but performance at the time of semi-load (FIG. 4) or at the time of constant-load (FIG. 5) is also carried out in accordance with the flowchart in FIG. 28. As shown in FIG. 28, the millimeter wave radar 1 measures and monitors an inter-vehicular distance from a leading vehicle and a vehicle speed of the leading vehicle. The vehicle speed sensor 13 measures and monitors the subject vehicle speed. The axle load scale 9 measures and monitors the weight of cargo or passengers (S171). The control pattern selecting portion 40 of the brake control ECU 4 previously selects one of control patterns (FIGS. 3 to 5) based on the measuring result of the weight. The following explanation is based on an example in which the control pattern in FIG. 3 is selected.

The TTC is calculated by the inter-vehicular distance, the subject vehicle speed and the vehicle speed of a leading vehicle (S172). The calculation method is as described above. If the subject vehicle speed before brake control is started is 60 km/h or more (S173), if the steering angle before the brake control is started is equal to or less than +30 degrees and equal to or more than −30 degrees (S174), if the TTC is in the region (1) shown in FIG. 3a (S175), and if there is no braking operation by the driver (S178), the "warning" brake control is employed and carried out (S182). If there is a braking operation by the driver (S178), a braking operation when the "warning" brake control is carried out and a brake force generated by the driver's braking operation are compared with each other (S179), and if the brake force generated by the driver's braking operation is greater (S180), the brake force generated by the driver's braking operation is employed (S181).

If the TTC is in the region (2) shown in FIG. 3a (S176) and if there is no braking operation by the driver (S183), the "enlarged region brake" control is employed and carried out (S187). If there is braking operation by the driver (S183), a brake force when the "enlarged region brake" control is carried out and a brake force generated by the driver's braking operation are compared with each other (S184), and if the brake force generated by the driver's braking operation is greater (S185), the brake force generated by the driver's braking operation is employed (S186).

If the TTC is in the region (3) shown in FIG. 3a (S177) and if there is no braking operation by the driver (S188), the "full-scale brake" control is employed and carried out (S192). If there is a braking operation by the driver (S188), a brake force when the "full-scale brake" control is carried out and a brake force generated by the driver's braking operation are compared with each other (S189), and if the brake force generated by the driver's braking operation is greater (S190), the brake force generated by the driver's braking operation is employed (S191).

If the subject vehicle speed before the brake control is started is less than 60 km/h and 15 km/h or more (S173, S193) and if the TTC is in the region (4) shown in FIG. 3c (S194), a driver is informed that a relative distance from the leading vehicle is short (S195). The driver is informed by means of an alarm display or a buzzer sound. If the TTC is in the region (5) shown in FIG. 3c (S196), the "full-scale brake" control is carried out (S197).

It is also possible to utilize a yaw rate from the yaw rate sensor 3 instead of the steering angle from the steering sensor 2. Alternatively, both the steering angle and the yaw rate may be used.

INDUSTRIAL APPLICABILITY

According to the invention, it is possible to realize an automatic brake control in a truck or a bus, and to contribute to the traffic safety. Especially, it is possible to carry out the automatic brake control in a truck or a bus by an appropriate brake force in accordance with a friction coefficient between a road surface and a tire, and to contribute to the traffic safety. Alternatively, it is possible to appropriately compete with the auto-cruise function.

According to the invention, it is possible to utilize the automatic brake control in a truck or a bus with a collision avoiding operation by a driver, and to contribute to the traffic safety.

The invention claimed is:

1. An automatic brake control device comprising: control means for automatically performing brake control control based on a sensor output including a distance between a subject vehicle and an object existing ahead of the subject vehicle even if there is no driving operation, wherein the control means automatically performs stepwise brake control when an estimated value of time becomes less than a predetermined value; said estimated value being an estimate of time until a distance between the object and the subject vehicle becomes a predetermined distance or less and being based on a relative distance and a relative speed of the object and the subject vehicle obtained by the sensor output, wherein the control means increases a brake force or a brake reduction speed over three stages in time series for performing said stepwise brake control, said control means applying a brake control of a first braking stage until a time limit for avoiding collision by braking operation when the estimated value of time becomes smaller than a predetermined time before the time limit for avoiding collision by braking operation, applying a brake control of a second braking stage until a time limit for avoiding collision by steering operation when the estimated value of time becomes smaller than the time limit for avoiding collision by the braking operation, and applying a brake control of a third braking stage when the estimated value of time becomes smaller than the time limit for avoiding collision by the steering operation, friction coefficient estimating means for estimating a friction coefficient state between a road surface and a tire, and brake reduction speed adjusting means for reducing the braking force or the brake reduction speed of the third braking stage into that of the second braking stage or increases the set value of the time limit for avoiding collision by braking operation and the time limit for avoiding collision by steering operation if an estimation result of the friction coefficient estimating means indicates that the friction coefficient is small but does not generate slip.

2. The automatic brake control device according to claim 1, wherein the estimation result is divided into a plurality of stages in accordance with a degree of the friction coefficient, brake reduction speed adjusting means for reducing the braking force or the brake reduction speed in a plurality of stages in accordance with the divided estimation means.

* * * * *